United States Patent
DeAnna et al.

(10) Patent No.: US 7,529,767 B2
(45) Date of Patent: *May 5, 2009

(54) SYSTEM FOR DEVELOPMENT, MANAGEMENT AND OPERATION OF DISTRIBUTED CLIENTS AND SERVERS

(75) Inventors: Robert DeAnna, Sante Fe, NM (US); Bryan Freeland, Phoenix, AZ (US); Bill Gockeler, Oxford, NJ (US); Erik Huestis, Holmes, NY (US); Michael Huestis, Holmes, NY (US); Dan McFeely, Phoenix, AZ (US)

(73) Assignee: Zeosoft Technology Group, Inc., Tampa, FL (US)

( * ) Notice: Subject to any disclaimer, the term of this patent is extended or adjusted under 35 U.S.C. 154(b) by 65 days.

This patent is subject to a terminal disclaimer.

(21) Appl. No.: 11/176,847

(22) Filed: Jul. 7, 2005

(65) Prior Publication Data

US 2006/0031237 A1 Feb. 9, 2006

Related U.S. Application Data

(62) Division of application No. 10/268,924, filed on Oct. 11, 2002, now Pat. No. 6,947,943.

(60) Provisional application No. 60/337,579, filed on Oct. 26, 2001.

(51) Int. Cl.
*G06F 17/30* (2006.01)

(52) U.S. Cl. .................. 707/102; 707/4; 707/103 R; 709/203; 709/217

(58) Field of Classification Search .................. 707/4, 707/10, 100, 102, 103 R; 706/61; 709/219, 709/203, 217; 717/120

See application file for complete search history.

(56) References Cited

U.S. PATENT DOCUMENTS

| | | | | |
|---|---|---|---|---|
| 4,839,822 A | * | 6/1989 | Dormond et al. | 706/45 |
| 4,868,866 A | * | 9/1989 | Williams, Jr. | 707/9 |
| 5,179,660 A | * | 1/1993 | Devany et al. | 709/219 |
| 5,712,960 A | * | 1/1998 | Chiopris et al. | 706/61 |
| 5,790,789 A | * | 8/1998 | Suarez | 709/202 |
| 5,890,158 A | * | 3/1999 | House et al. | 707/10 |
| 5,899,990 A | * | 5/1999 | Maritzen et al. | 707/4 |
| 6,125,363 A | * | 9/2000 | Buzzeo et al. | 707/100 |
| 6,269,373 B1 | | 7/2001 | Apte et al. | |
| 6,327,594 B1 | * | 12/2001 | Van Huben et al. | 707/200 |
| 6,553,375 B1 | * | 4/2003 | Huang et al. | 707/10 |
| 6,615,253 B1 | * | 9/2003 | Bowman-Amuah | 709/219 |
| 6,654,747 B1 | * | 11/2003 | Van Huben et al. | 707/10 |
| 6,662,357 B1 | * | 12/2003 | Bowman-Amuah | 717/120 |
| 6,701,514 B1 | * | 3/2004 | Haswell et al. | 707/102 |
| 6,836,889 B1 | | 12/2004 | Chan et al. | |

(Continued)

*Primary Examiner*—Shahid A Alam
(74) *Attorney, Agent, or Firm*—Antonelli, Terry, Stout & Kraus, LLP.

(57) ABSTRACT

A lightweight application server for use on portable or embedded devices includes an application manager and services containers. Each of these is managed by an admin server allowing for remote and rapid deployment and maintenance of applications, objects and features associated with the server-enabled portable or embedded devices. This permits portable devices like PDAs to provide server functionality to each other, in a fully portable network if desired. A system including such server-enabled portable or embedded devices may include, among other things, a decision flow server for facilitating distributed decision flow processing.

51 Claims, 9 Drawing Sheets

U.S. PATENT DOCUMENTS

| | | |
|---|---|---|
| 6,865,732 B1 | 3/2005 | Morgan |
| 7,143,419 B2 | 11/2006 | Fischer et al. |
| 7,162,543 B2 | 1/2007 | Fischer et al. |
| 7,188,183 B1 | 3/2007 | Paul et al. |
| 7,200,643 B2 | 4/2007 | Latvakoski et al. |
| 2001/0025307 A1 | 9/2001 | Venkatraman et al. |
| 2002/0038335 A1 | 3/2002 | Dong et al. |
| 2002/0038336 A1 | 3/2002 | Abileah et al. |
| 2002/0049864 A1 | 4/2002 | Kappet et al. |
| 2002/0077958 A1 | 6/2002 | Gardner et al. |
| 2002/0091837 A1 | 7/2002 | Baumeister et al. |
| 2002/0116540 A1 | 8/2002 | Maeda et al. |
| 2002/0152268 A1 | 10/2002 | Kureshy et al. |
| 2002/0161828 A1 | 10/2002 | Edison et al. |
| 2003/0018708 A1 | 1/2003 | Hlasny |
| 2003/0037181 A1 | 2/2003 | Freed |
| 2003/0065715 A1 | 4/2003 | Burdick, Jr. et al. |
| 2004/0205771 A1 | 10/2004 | Sudarshan et al. |
| 2004/0255005 A1 | 12/2004 | Spooner |
| 2005/0025161 A1 | 2/2005 | Spooner |

\* cited by examiner

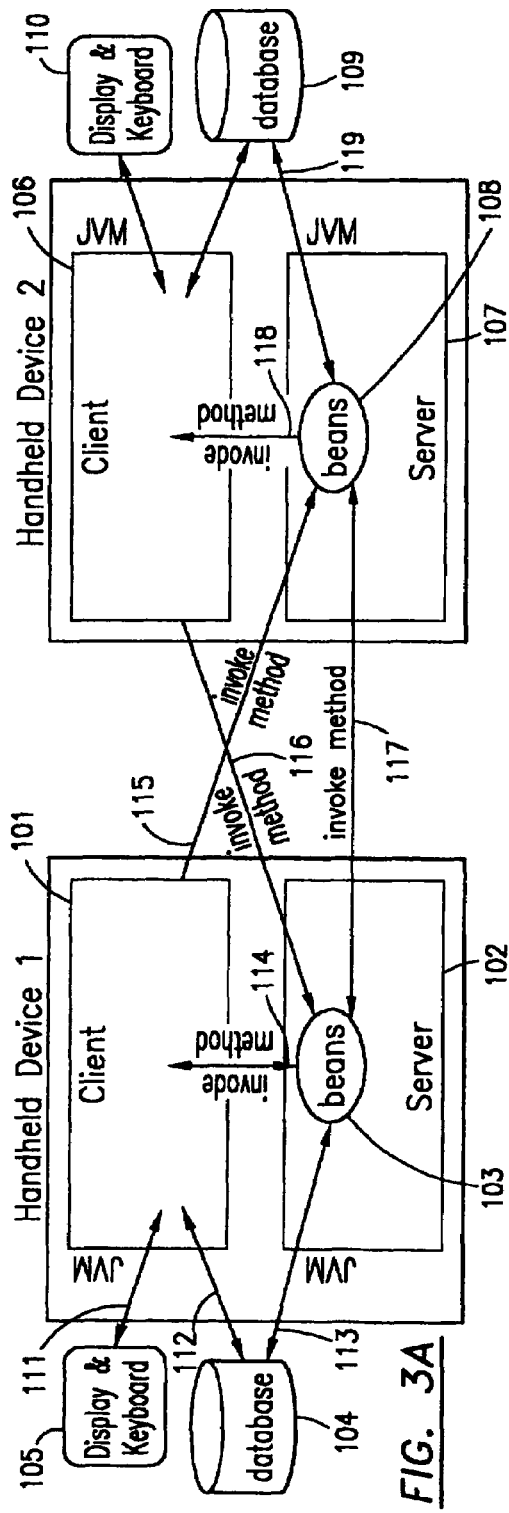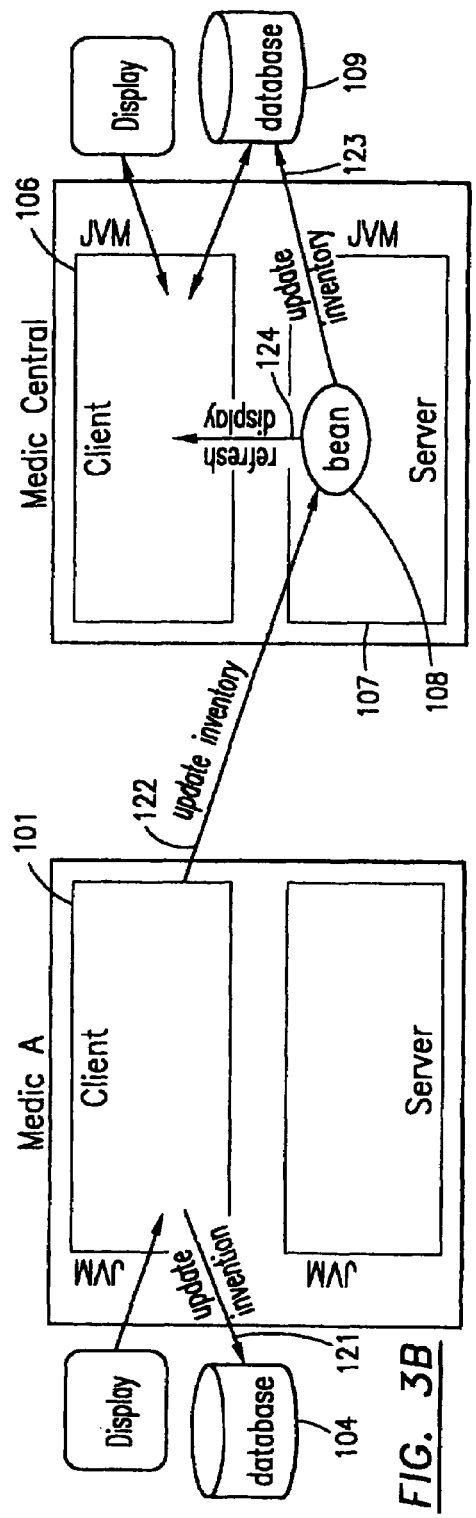

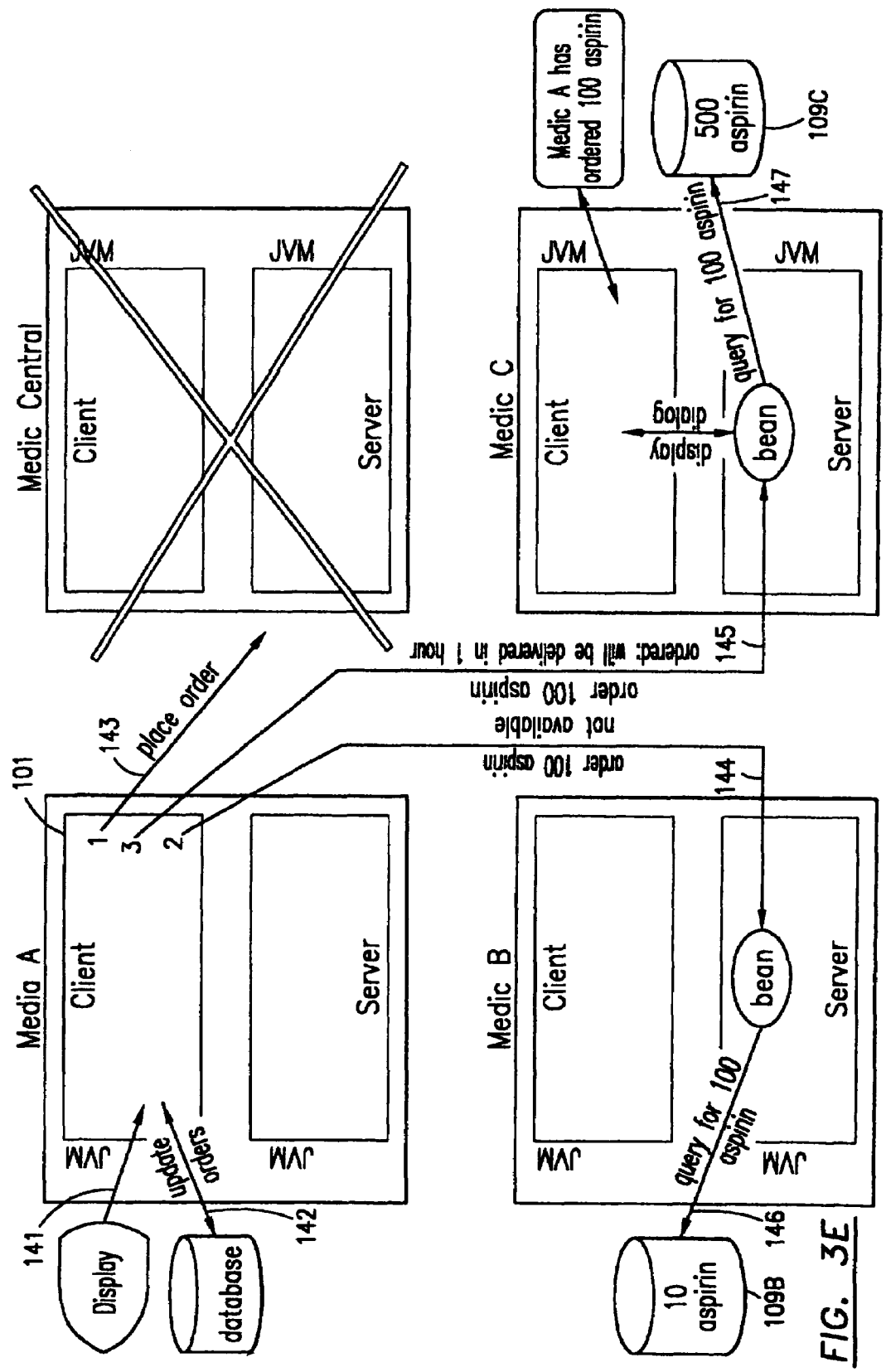

SYSTEM FOR DEVELOPMENT, MANAGEMENT AND OPERATION OF DISTRIBUTED CLIENTS AND SERVERS

RELATED APPLICATIONS

This application is a divisional application continuing from U.S. non-provisional application Ser. No. 10/268,924 filed on Oct. 11, 2002 now U.S. Pat. No. 6,947,943 which is a continuation in part from U.S. provisional application No. 60/337,579 filed on Oct. 26, 2001, entitled "Distributed, Multi-User, Multi-Thread Application Development Apparatus and Method," which are fully incorporated herein by reference for all purposes.

FIELD OF THE INVENTION

The invention in general relates to systems for developing, integrating, operating and managing diverse client and server hardware and software devices, and more particularly to a system for utilizing distributed application servers to form a robust organizational information network.

BACKGROUND

As processing and network technologies becomes progressively more advanced, the demand for software capable of taking full advantage of these advances correspondingly rises. However, many organizations dependent on information technology are struggling to manage complex heterogeneous environments that incorporate distributed and disparate hardware, software, applications, networks, and database systems. Thus, there has been an increasing demand and need for information resources and software that is flexible, robust, and easily upgraded and customized. Moreover, it is desirable for these systems to be hardware independent, support multiple users and hardware platforms, and be based on a distributed architecture.

There have been many attempts in the prior art to provide such an adequate information system. These systems, however, have been based on proprietary code that is hardware dependent, inflexible, difficult to upgrade, and difficult to maintain. An example of one such prior art system is disclosed in U.S. Pat. No. 4,839,822 which discloses an expert system for use in treating various types of trauma. This prior art expert system is a diagnostic system which is used to recommend a course of treatment based on information input from the user. The system achieves this result primarily through the use of a knowledge base and an inference engine. The software uses the well known Personal Consultant Plus inference engine, along with the Structured Query Language (SQL) database engine and the Essential Graphics software package. Based on the information input from the user, the inference engine receives information from the knowledge base which includes a collection of rules and parameter descriptions, upon which the treatment is suggested.

This prior art system, however, suffers from several shortcomings. Since the software is written in Microsoft C, upgrading or rewriting the code is significantly difficult and time consuming. For example, a rewrite of the code in order to use a different inference engine or a different database server would consume considerable time and effort. Moreover, the portability of the software is very limited. Due to inherent limitations of the C programming language, different versions of the software must be compiled for each different type of client computer used. An additional drawback to this type of software is how the data is stored. The data in a SQL relational database, for example, is stored in tables made up of rows and columns of records. In order to access this data, the methods for accessing it must be coded separately from the data.

Other prior art information systems known to applicants suffer similar drawbacks in that they generally accomplish their goals at the expense of cross platform capability, software maintainability, and cumbersome data retrieval and storage. This is so even though more flexible programming languages, such as Java, by Sun Microsystems, have been developed and even though the use of inference engines has increased. Therefore, it would be desirable to create a more flexible development and deployment system for software functionality across an organization, as well as systems that are more robust, flexible, maintainable, upgradable, and cross-platform capable than currently available in the prior art. Just such a solution to the problems noted above and more, is made possible by our invention.

SUMMARY

An illustrative summary of the invention, with particular reference to the detailed embodiment described below, includes a lightweight application server for use on portable or embedded devices, the application server including an application manager. This permits portable devices like PDAs to provide server functionality to each other, in a fully portable network if desired. A system including such server-enabled portable or embedded devices may include, among other things, an admin server operable to manage the device application servers, and a decision flow server for facilitating distributed decision flow processing.

THE FIGURES

The invention may be more readily appreciated from the following detailed description, when read in conjunction with the accompanying drawings, in which:

FIGS. 2A-2D are block diagrams further illustrating components of the system of FIG. 1, in which:

FIG. 2A illustrates a ZeoSphere server deployed on a wireless device;

FIG. 2B illustrates an admin and decision flow server deployed on an enterprise server;

FIG. 2C illustrates the logical components of the ZeoSphere server, admin server, and proxy server operating with the system of FIG. 1; and FIG. 2D illustrates a process flow between two wireless devices operating ZeoSphere servers;

FIGS. 3A-3E are block diagrams further illustrating process flows between two wireless devices each operating both a ZeoSphere server and a client process, in which:

FIG. 3A illustrates clients invoking methods on remote beans, either directly or via its own application server;

FIG. 3B illustrates a first client invoking an "update_inventory" method on a second client's bean;

FIG. 3C illustrates a client Instant Messenger A sending a message to Instant Messenger B via a server bean on a second device;

FIG. 3D illustrates a remote client invoking a "place_order" method on an enterprise Medic Central bean; and FIG. 3E illustrates possible responses to a first client invoking a "place order" method;

DETAILED DESCRIPTION OF AN EMBODIMENT OF THE INVENTION

The ZeoSphere mobile platform, described here in detail as a presently preferred embodiment according to our invention, provides a robust solution for extending the sharing and processing of data throughout a distributed organization, and empowering a rapid development and deployment environment within that system. In the present embodiment it is implemented in a complimentary suite of solutions described below, including a ZeoSphere server (a lightweight server operable on portable devices such as remote, wireless and handheld hardware devices and embedded hardware devices), a ZeoSphere Decision Flow server (for implementing decision flow processes), a ZeoSphere proxy server, and a ZeoSphere tools set. This platform was designed with a highly mobile and rapidly evolving organization in mind, where even remote client devices can operate as servers any device-to-device information processing and communications. The unique methodology and technology of the ZeoSphere mobile platform, captured in a unique software architecture, enables flexible and rapid device and software integration, reduces development risk and moves one step closer to the goal of pervasive computing and knowledge sharing within large, distributed, diverse systems of users, software and hardware platforms.

Figure 1:
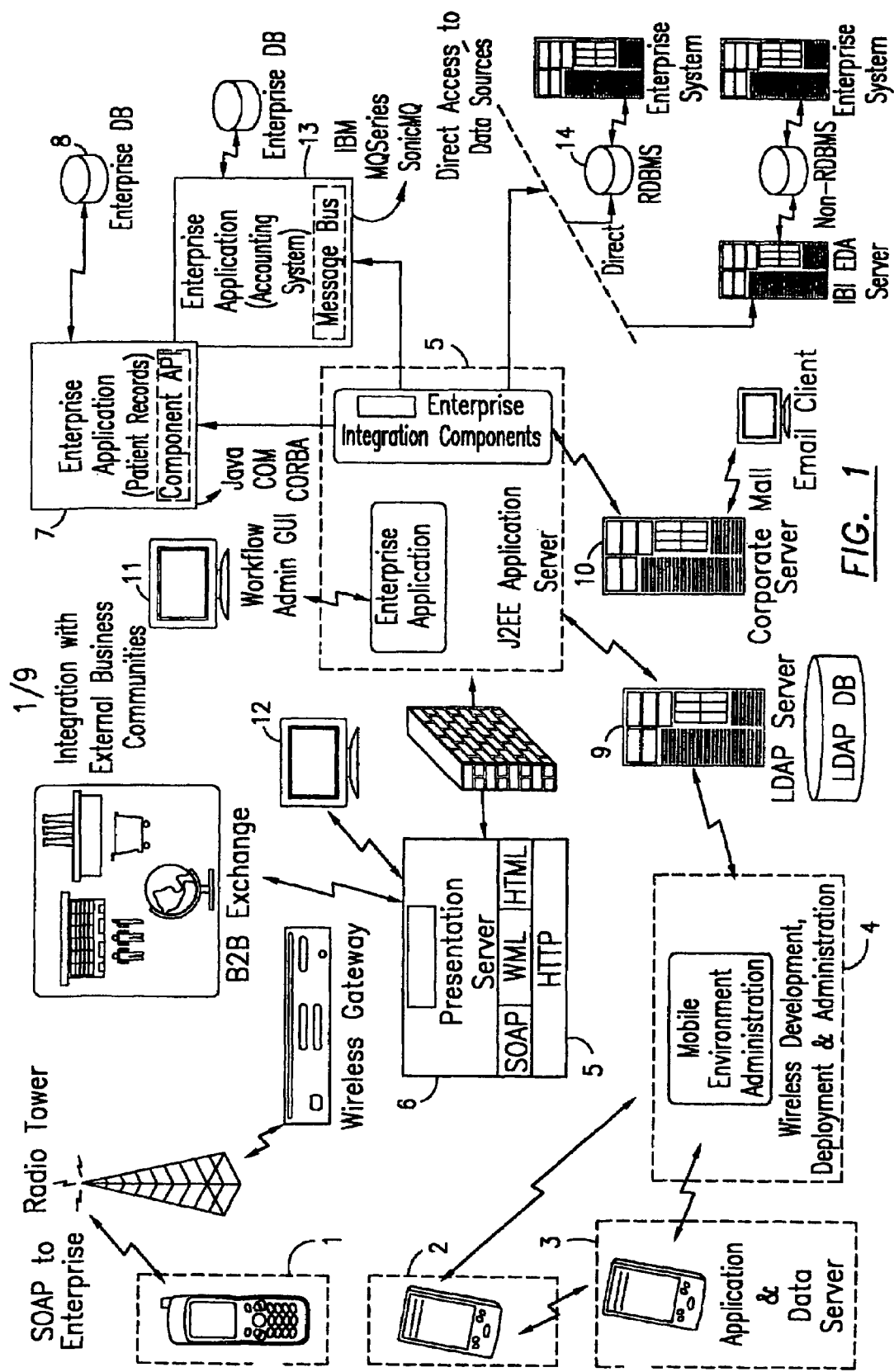
FIG. 1 is a general schematic of a system illustrating a first embodiment of the invention.

This preferred embodiment of the invention may be better understood by first considering the illustrative organizational system shown in FIG. 1. Organizations of any size are increasingly dependent on a variety of processing platforms, ranging from fixed database and application server entities (7-10, 13-14) to small, mobile devices (1-3). The personal digital assistants, or PDAs (like devices 2-3) of today have more processing power and mission-critical applications than personal computers of just fifteen years ago. Yet the inability to do more than limited synchronization and wireless messaging limits the ability of an organization to extend its knowledge infrastructure to truly coincide with presence of its people and devices. In a typical system, this limited synchronization usually occurs by a tethered, wire-based solution where the information and applications are updated only when physically connected to the network. This additionally limits the ability of users and administrators to modify device applications and parameters, so system-wide upgrades or synchronizations may take weeks to accomplish.

The ZeoSphere mobile platform overcomes these limitations by providing intelligent, server functionality to mobile devices, and providing a flexible architecture for changing device features on demand. The ZeoSphere mobile platform may advantageously be used with platform independent approaches like that offered by Java, permitting an organization to blend a disparate patchwork of devices like legacy enterprise applications 13, databases 14, administrators 4, 12, and handheld devices 1-3 into a system that can be structured to have all devices function to provide information services. Thus, each mobile server device 1-3 in a current implementation includes a ZeoSphere server operating on a Java virtual machine (JVM), and the enterprise suite of ZeoSphere tools, Decision Flow (ZDF) server, and proxy server similarly operate on a JVM. Those skilled in the art will readily appreciate how the ZeoSphere mobile platform can be implemented with platform dependent systems (as is true of much embedded software), as well as alternative platforms like Linux, etc. The platform may be better understood by additional reference to the illustrated components of these products in FIGS. 2A through 2D.

Figure 2A:
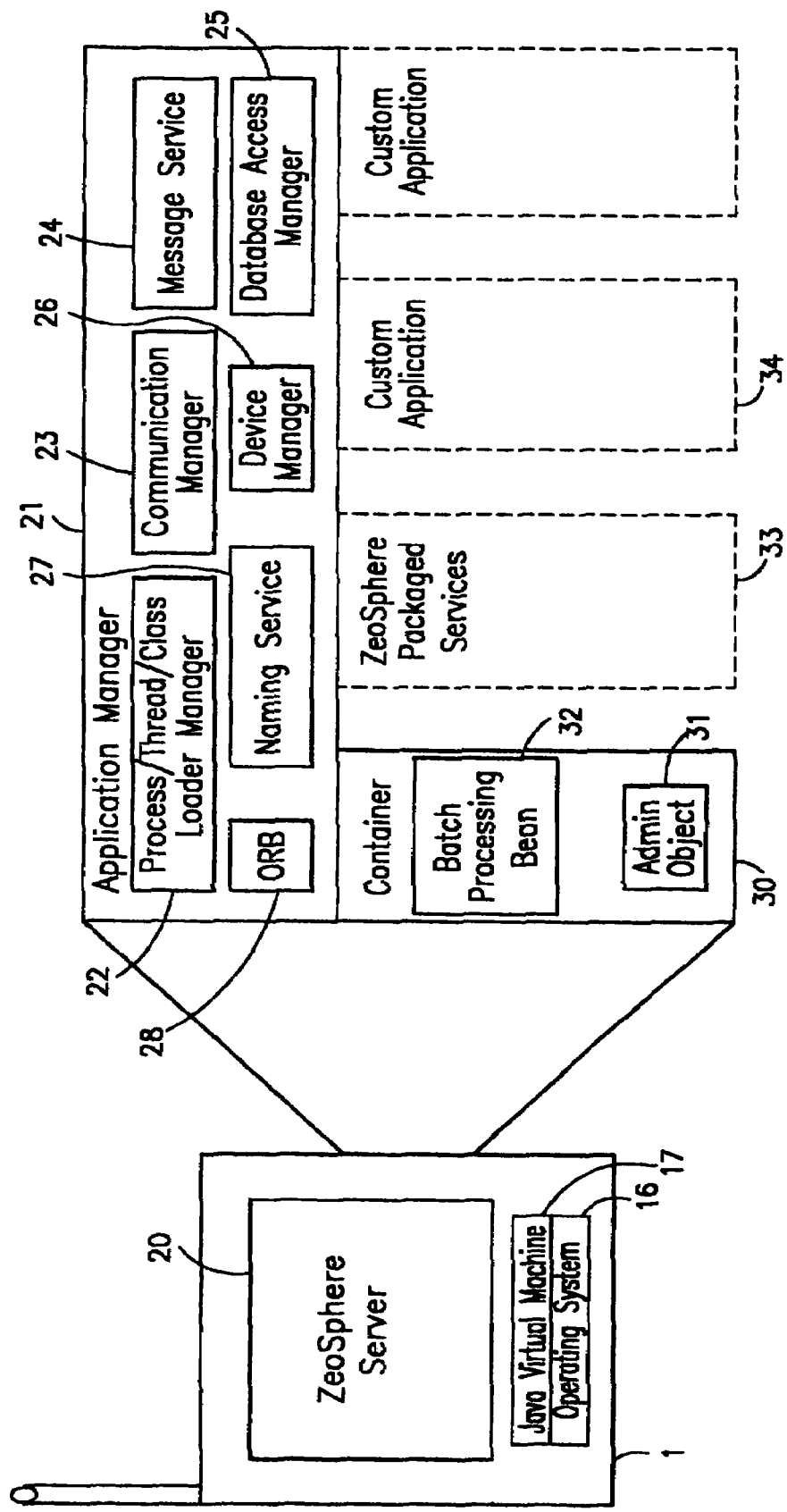

Turning first to FIG. 2A, a ZeoSphere server 20 is shown operating on JVM 17 and operating system 16 in device 1. The preferred ZeoSphere server container includes an application manager 21 and services containers 30, 33, 34, together forming an application server. The current implementation of the application manager 21 includes a process/thread/class loader manager 22, a communication manager 23, a message service 24, a database access manager 25, a device manager 26, a naming service 27, and an ORB component (in this case a remote management CORBA object). The services containers include beans 32 (in a Java implementation) and an app server admin object 31, and may be packaged services 33 (e.g., for ease of deployment) or custom applications 34 on the device 1.

Figure 2B:
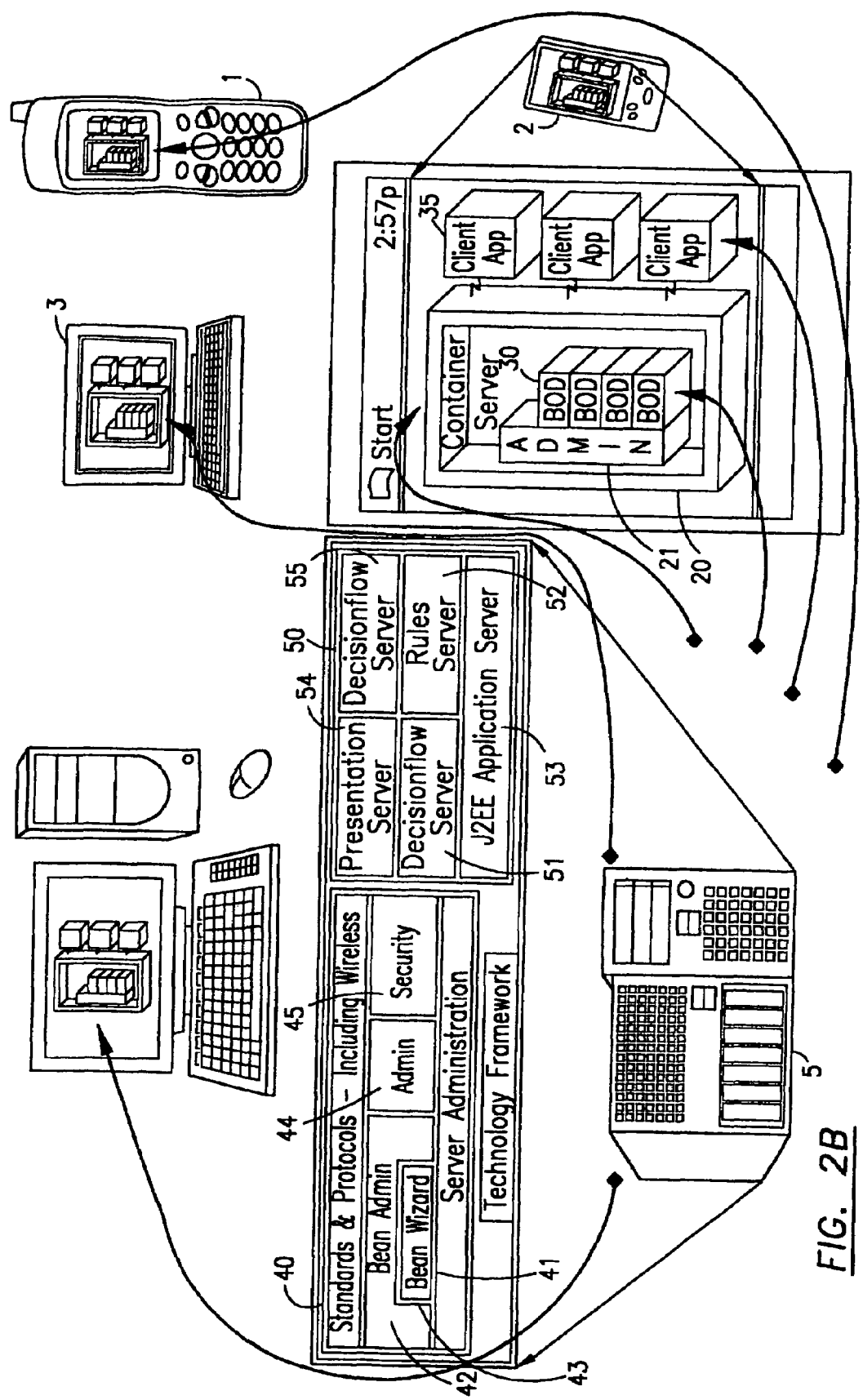

The key infrastructure pieces, the ZeoSphere tools and ZDF server are illustrated in FIG. 2B. The ZeoSphere tools 40 include server admin tools 44, remote or over the air (OTA) deployment tools (including a security and application administrator) 45, and development tools 41 (including a bean administrator 42 and bean wizard 43). A current version of the ZDF server 50 runs on a J2EE application server, and includes a decision flow server 51, a rules server 52, a presentation server 54 and decision flow actions 55. The ZeoSphere tools 40 are used to both develop and deploy new software to run on devices 1-3 (e.g., via bean wizard 43 and OTA deployment tools 45), and to manage the software on the ZeoSphere servers 20 on these devices. The ZDF server 50 helps in the development of decision-oriented workflow processes, and also controls the workflow processing including remote processing on device 2 via the businessware containers 30 in server 20 or other client application 35. The operation of both of these programs will be discussed in more detail below.

Figure 2C:
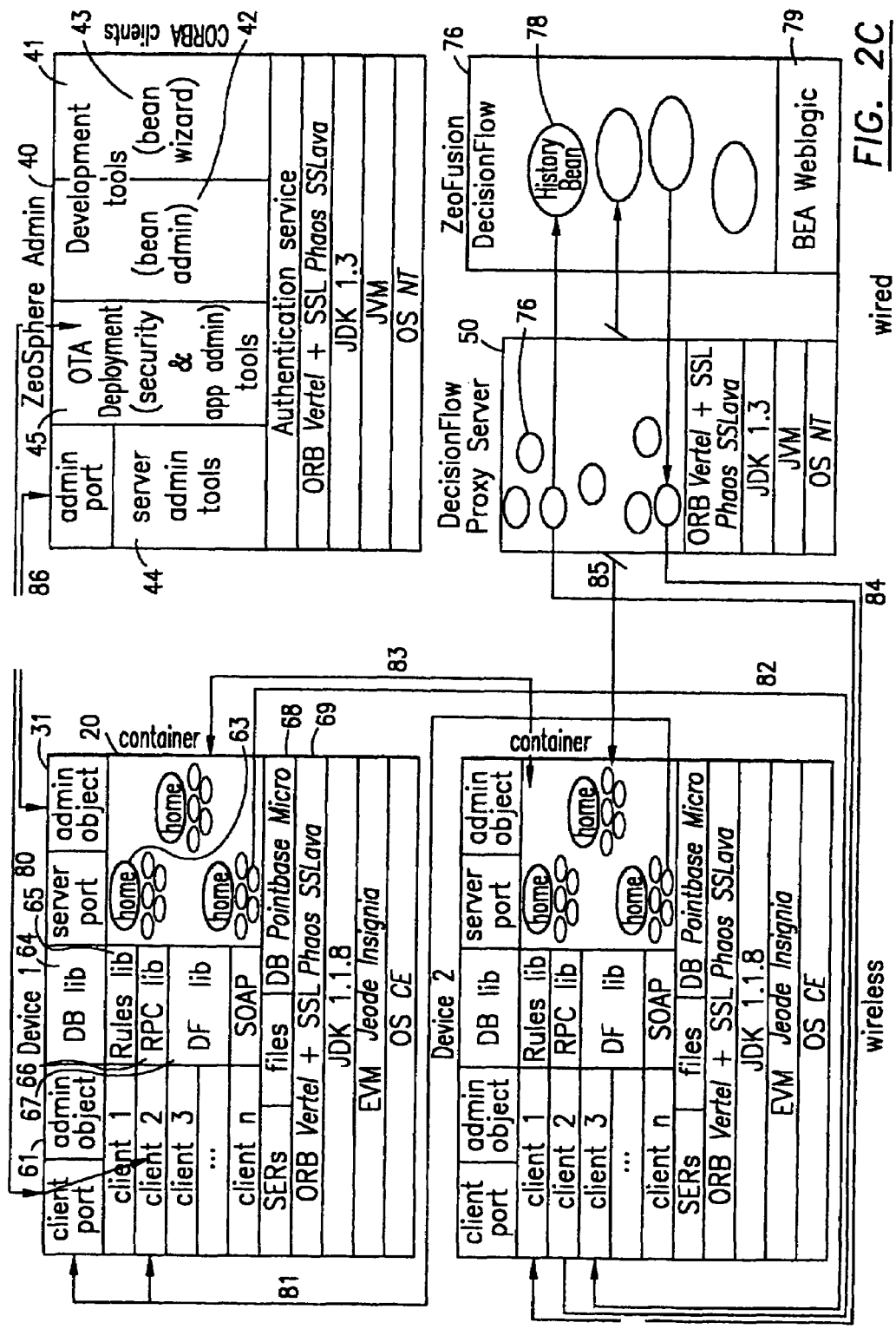

Turning now to FIG. 2C, the logical components of the ZeoSphere server 20, ZeoSphere tools 40, and ZeoSphere proxy server 75 are further illustrated. In this case both devices 1, 2 have ZeoSphere servers running on Java-based platforms. The ZeoSphere server 20 of device 1 includes an app server admin object 31 and bean pools 63.

A remote management object (e.g., CORBA object) 61 is also associated with the ZeoSphere server 20. In the current implementation the remote admin object 61 resides within a remote management server component, and is used for deploying and installing client applications on wireless device 1 (e.g., CAB files for CE devices, JAR files for Java devices, etc.), and is managed by a Roles/Application Administrator GUI (graphical user interface) of ZeoSphere tools 40. It advantageously resides within a lightweight container, and the implementation of its interface allows for starting and stopping servers, deploying a client application it receives wirelessly, and receiving and storing new server information (logging level, pool size, status evaluation frequency) about servers. Remote admin object 61 manages the Remote Management Server Container, which maintains among other things a list of Callback Objects to communicate back to the Administrative GUI's when needed. The Remote Management Server Container interface permits, e.g.: initialize the container; register/deregister a client; sending a message to clients; sending a message to Remote Management Administrators; set a reference to "Remote Management". The Remote Management Server permits, e.g.: creating a CORBA container; creating remote admin object 61; and starting and stopping the server.

The admin object 31 is used for running applications on device 1, and is managed by the Roles/Application Administrator GUI, Server Administrator GUI and Bean Administrator GUI of ZeoSphere tools 40. The admin object 31 is an extension of the remote admin object 61, and allows for the remote management of components such as bean pools running within the ZeoSphere server 20 it is managing. It also allows for the remote (e.g., wireless) deployment of components both within and outside the container, as well as descriptor files describing that information. Thus, e.g., the admin object 31 interface allows for: starting and stopping bean pools; sending back the status of bean pools; deploying a bean jar/archive it receives wirelessly; receiving and storing new bean information; and changing the deployment mode of a server (production vs. development). The admin object 31 manages an Application Server Admin Container, which contains small components such as pools of CORBA-based EJB (enterprise Java bean) objects. These EJBs are preferably Session Beans, which are currently partially compliant per the v1.0 EJB/CORBA mapping. Security may also be implemented, e.g., per the EJB version 1.0 specification. Security (or other services) may even be enforced by the application manager via a security application (e.g., access control) within the service container to manage external objects/applications (e.g., limit access to a JESS engine or VisualBasic program). Further, roles specified in the beans' deployment descriptor are used in determining if it is permissible for the beans' method to be executed by the client. Roles are currently maintained in the Application/Role Administrator. The Application Server Admin Container allows for the following: starting and stopping CORBA-based EJB Objects in a pool; reserving a CORBA-based EJB Object and returning a reference of such to client; releasing a CORBA-based EJB Object back to the pool; returning Status information of the CORBA-based EJB Object Pool.

Because of this architecture, the application server 20 also has the intelligence to determine what other devices 2 would be interested in the components (e.g., bean pool 63) it is running. When these components start up, these interested devices 2 are informed that the components are running and are available for use for ZeoSphere client applications running on their device.

ZeoSphere tools 40 preferably provide for convenient administration of the ZeoSphere servers by means of user GUIs. The server admin 44 GUI allows an administrator to monitor/manage ZeoSphere servers on "n" devices, start/stop/update object pools and bean pools on ZeoSphere Servers, and register/deregister additional ZeoSphere servers. This GUI also allows the administrator to deploy this information to any wireless or wired device running a ZeoSphere server. It communicates (e.g., messaging 86) with any ZeoSphere server via the admin object 31 running inside each ZeoSphere server 20.

The OTA administrator GUI for OTA deployment tools 45 allows the administrator to: deploy application information to a client; add/update/delete Administrator Device list info; add/update/delete Person Server and Client Device list info; deploy any of the above information to any desired server/client device; and associate Role with "Administrator" device. This GUI also allows an administrator to deploy this information to any wireless or wired device running a ZeoSphere server (even if just a remote management server component). This GUI also communicates with any ZeoSphere server via the admin object 31 running inside each ZeoSphere server. Furthermore, it communicates (e.g., messaging 80) with any remote management server component via the remote admin object 61 running inside each remote management server.

The development tool 41 includes three administrator GUIs, for the bean and application administrators 42, 45 and bean wizard 43. Each administrator GUI provides a different set of core services and sends requests or receives information from the CORBA objects running on the devices of which it is aware. The bean administrator's GUI allows the administrator to: add/update delete bean properties; add/update/delete roles associated with bean methods; create/update beans via the bean wizard; and deploy beans and bean descriptors to any desired server. The GUI also allows an administrator to deploy this information to any wireless or wired device running a ZeoSphere server, and communicates with any ZeoSphere application server via the admin object 31 running inside each ZeoSphere application server. The Application/Roles Administrator allows the administrator to: add/update delete Roles; add/update/delete application list; associate Roles with applications or client devices and beans with applications (used by containers for P2P (peer-to-peer) devices); add/update/delete Person Client device list info; associate Role with an Administrator device; and deploy any of the above information to any desired server/client device. This GUI also allows an administrator to deploy this information to any wireless or wired device running a ZeoSphere server or remote management server. It communicates with any ZeoSphere server via an admin object 31, and also communicates with any remote management server component via a remote admin object 61. Finally, the bean wizard allows for the creation/modification of CORBA-based beans that run within the ZeoSphere server container. These beans may be partially compliant with EJB v1.0 CORBA-mapping specification.

Developing Beans. In the preferred embodiment, the ZeoSphere bean wizard 43 only creates session beans (either stateless or stateful). These ZeoSphere session beans implement the business logic, business rules, and workflow of the ZeoSphere system. Stateful session beans should be used when the same client may call multiple methods. In this way, if multiple methods are called consecutively, each method has the current state of the bean. For example, a bank teller bean may need to perform several transactions for a single client. If a client first withdraws money and then requests an account balance, the account balance should be based on the balance after the withdrawal—an operation which requires that the bean's state be saved. Transaction type information may be excluded where memory constraints are present, but may also be desirable for a given process. For example, if you want a bean that orders a product and deducts money from a customer's credit account, you do not want the money to be deducted without the product's being successfully ordered. Neither do you want the product to be ordered without the money being deducted. If either process fails, they should both fail, and a transactional bean helps ensure that one process does not occur without the other(s). If the bean is transactional, one should also decide between single and two-phase transactions. Two-phase transactions may be needed in situations in which two or more Java bean servers cooperate to manage a single transaction (i.e., a distributed transaction). One skilled in the art will understand how to implement such, and how to develop appropriate beans for the desired client/server functionality.

Once a bean has been created, it is preferably archived with all of its necessary files for deployment (this can be done by the bean wizard 43 at the end of the bean definition phase). Deploying a bean to a ZeoSphere server 20 informs the container of the bean's management and life cycle requirements, persistence requirements, transaction requirements, security requirements, and properties. The deployment may be conveniently accomplished via a simple drop down list of active servers and radio buttons (e.g., depending on the target device, CAB for CE devices, JAR for Desktops or SaveJe devices). One may not want to deploy a bean to more than one server in a cluster. When an administrator wants to change a bean's properties without re-archiving and re-deploying it, she can do so by updating the bean's property and then deploying the Bean's descriptor. The ZeoSphere tools 40 also conveniently enable the management of beans, e.g., by browsing GUIs or automated tools for adding, removing, finding, updating versions, and importing beans, as well as for easily changing server devices (ex: to find a bean on servers not currently open).

Returning to FIG. 2C, device 1 may also have one or more supporting components or services deployed. In a Java-based implementation a minimum CORBA ORB 69 and device resident JVM may be required, the ORB facilitating all device to device (e.g., messaging 81-83), device to administrator (e.g., messaging 80, 86) or device to enterprise/proxy servers (e.g., messaging 84, 85) communications within the ZeoSphere environment, and the JVM for running the Java-based ZeoSphere server 20. Optional components, depending on the functionality desired for the device, may include: a database library 64 for accessing micro databases 68; a decision flow library 67 for sending requests to the decision flow engine of ZDF server 50; an inference rules engine (Sandia National Laboratory's JESS rules engine is preferred for many applications given its compact structure), and a rules library 65 (e.g., for executing JESS Rules via the JESS inference engine); a SSL/encryption library 69 for secure, encrypted socket and IIOP transmission; and a client EJB proxy component for executing a request to EJBs via an EJB proxy server (e.g., server 75, which may delegate the request to the appropriate bean/method within a J2EE EJB server). The ZeoSphere Rules Interface for Rule Lib 65 allows for the loading of a rule; mapping objects to a rule; executing the rule; getting back mapped objects from the rule; resetting the rule engine; and firing property change events. The ZeoSphere database engine allows for logging on to the database 68 (e.g., creating a JDBC connection); executing a query; executing a query with a parameter list; and logging off the database (releasing the JDBC Connection).

The ZeoSphere EJB proxy server (e.g., ZDF server 50) is an instance of ZeoSphere, typically running on a wired network and containing a pool of EJB proxy beans. A ZeoSphere client or server running on a mobile (e.g., wireless) device can submit a request to an EJB via the ZeoSphere client EJB proxy component described above. An EJB proxy bean running within proxy server handles this request, which is delegated to the EJB proxy bean/method described in the request passed as a runtime argument.

The example of FIG. 2C illustrates the case of an on-device server with an administrative client. On the device side there may be ZeoSphere servers running on "n" devices along with any associated applications, while on a desktop computer somewhere an instance of the ZeoSphere Administrative Tools manages the device(s) and their components. This is the preferred configuration, as it allows an administrator to fully manage device applications from the ZeoSphere tools 40 via the remote management server. An alternative configuration would include an on-device server but without an administrative client. This scenario is similar to the first except the remote management server and ZeoSphere tools 40 are not used. All client-to-server interaction takes place device-to-device using the applications available on the device(s) 1-2 (e.g., iExchange or iMessenger). In this case, one may only interact with the beans that exist on another wireless handheld running ZeoSphere. A further configuration includes a stand-alone deployment, in which a device is used simply to run applications installed on the Device using a process other then ZeoSphere (e.g., Active Sync). However, this limits interaction to on-device applications (e.g., wireless mail), and there may be no device to device interaction or interaction between the device and any of the ZeoSphere tools 40.

The ZeoSphere Authentication Service. The ZeoSphere Authentication Service is dedicated to receiving incoming authentication requests from ZeoSphere Administrator (username and password) and authenticating them against either an LDAP repository or an encrypted security object residing on the Local File System. The default authentication route is preferably a Local File System.

The authentication layer for the ZeoSphere Administrator is illustrated as residing just underneath the GUI level for ZeoSphere Administrator. This is to show that authentication should be required before any of the four GUIs provided by ZeoSphere Administrator can be used.

To allow for the most robust authentication service possible, ZeoSphere Authentication Service is currently based on JNDI 1.2 API (fully supports LDAP and file system providers), and comes with a utility for adding new users. In the first feature, the Java Naming and Directory Interface (JNDI, a standard extension to Java), provides Java-enabled applications with a unified interface to multiple naming and directory services in an enterprise. By using a flexible approach like JNDI administrators may be allowed to configure applications to use either an LDAP database or a local file system object to authenticate users to the ZeoSphere mobile platform. A file system is the default security mechanism, and for environments where an LDAP server is not required or desirable, the ZeoSphere Authentication Service can use the local file system as a naming and directory provider. In this mode, user objects are created that contain a number of fields specific to the user. The information in these fields is stored in the local file system within a bindings object file located in the "javaobjects" directory off of the root directory of ZeoSphere. This file has no name but has a .bindings extension. The server provides password encryption so that all information stored within this file is protected. If LDAP is used, the LdapContext interface allows an application to use LDAP v3-specific repository. When an authentication request is received, it is passed on to the LDAP server for authentication. Interfacing with the LDAP server is done through the Java Naming and Directory Interface (JNDI) API, e.g., using the LDAP provider provided by Sun. If the LDAP server supports local authentication in addition to LDAP authentication, the server inherits this capability. This capability allows users of ZeoSphere applications to login using their Windows NT username and password.

The Role/Application Administrator. As noted above, the ZeoSphere Application Development Tool 41 has two main functions: (1) to add an application to the ZeoSphere network and develop it by adding (or deleting) its own beans and roles (and generate the application's initialization code); and (2) create or delete ZeoSphere roles and manage them. By contrast, the OTA Administrator 45 handles the actual addition (or deletion) of administrator, server, and client devices to the ZeoSphere mobile platform, and deploy an application to a server device. Tasks that can be performed from either interface includes the deployment of current application, role, and administrator, server, and client device information to all running, registered servers; as well as starting ZeoSphere, deploying an application to a client, and generating an application bean's archive file.

Turning now to the application development tool, the role/Application Administrator functions to associate or disassociate a role or server-side bean from given applications. In the case of registered applications, application information is used by the ZeoSphere container, in conjunction with the client device information below, to determine which client devices would be interested in communicating with the beans running in the ZeoSphere container on the server device. The server device then establishes secure, p2p secure SSL-over-IIOP communication with those client devices. Application information maintained includes the names of applications, associated roles, and associated remote, server-side beans. Automated application tools may be used to add or remove beans or roles from the registered applications.

In the case of roles, when a method is executed on a server-side bean, the ZeoSphere container compares the valid roles for the bean and bean method, with the role of the client. If there is no match, the method is not executed and an exception is thrown back to the client application. The role of the client is passed remotely from the client to the server's bean via a method call from the bean's "client interface" object, called a shadow. Using this method it is possible to provide a layer of protection to the client applications. You may have an application where the only person allowed to access it would be the administrator. In this scenario only one role is necessary—administrator. The administrator role would then be associated with the proper application. On the other hand, you may have an application where there needs to be an executive, a manager, and an administrator. In this scenario the application would require these three roles to be created and associated with the proper client application.

Roles have the following features and characteristics: they can be added and deleted; a role hierarchy is supported (i.e., each role can have a Parent role and multiple children roles); the domain of roles is stored in either a serialized Java bean (e.g., identityDomain.ser) or a LDAP server, and this domain file can be deployed wirelessly to any device running ZeoSphere; and these roles can be associated with a bean or bean methods via the bean Administrator.

Device Management. The main purpose of the ZeoSphere OTA Administrator 45 is to facilitate the management (i.e. add, update, delete and deploy) and transfer of information between itself and ZeoSphere clients and servers. The server Administrator may be used to enable an administrator manage the ZeoSphere servers running on an unlimited number of devices, specifically their bean-management configurations.

To use the OTA Administrator it is first necessary to authenticate using a proper login and ID. It is also necessary to ensure that the ZeoSphere server is running on at least one device in your environment. To change a server device, one may select a server (e.g. from a convenient menu, or by the IP address of the server to be connected). Server, client and/or administrator device information may then be changed as desired.

With respect to server device information, this is used by the ZeoSphere ARA (or remote access) to determine which server devices to establish communications. Once determined, the ZeoSphere ARA establishes secure SSL-over-IIOP communication with those server devices. This allows all of the ZeoSphere ARAs to monitor, and send/receive information to/from each server device. The information maintained for each server device includes: server device ID; server device (Owner) Name; server device IP; server device phone number; server device email address; and server roles the device assumes. Once a server device is added the Administrator will attempt to communicate with the device and notify the administrator of the result.

In performing client device management, the OTA administrator facilitates adding or deleting a client device, deploying client device information and applications to the client, and starting a ZeoSphere instance on the client device. Client device information is used by the ZeoSphere container to first determine which administrator devices to establish communication with, and then establish secure SSL-over-IIOP communication. This allows all of the ZeoSphere ARAs to monitor, and send/receive information to/from each server Device. The information maintained for each client device includes: device ID; device (Owner) Name; device IP; device phone number; device email address; and roles the device assumes.

For administrator device management, administrators may similarly be added or deleted, and administrator information deployed. Administrator device information similarly is used by the ZeoSphere container to determine which administrator devices to establish communication with, after which the ZeoSphere container then establishes secure SSL-over-IIOP communication with those Administrator Devices. This allows all of the ZeoSphere ARAs to monitor, and send/receive information to/from each server device. The information maintained for each device includes: administrator device ID; administrator device (Owner) Name; administrator device IP; administrator device phone number; administrator device email address; and administrator roles the device assumes.

Managing ZeoSphere Server Parameters. The ZeoSphere server Administrator may also be used to remotely manage ZeoSphere server parameters. Thus, it may be used by an administrator to add, change and deploy the following information about each ZeoSphere server it is managing:

server Name (currently named ZeoBalanceserver);

Description (an optional description of the server and its purpose);

Default maximum pool size (this may be is overridden by the maximum pool size described for each bean Pool);

Default minimum pool size (this may be overridden by the minimum pool size described for each bean Pool);

Time-out of a bean in use but "idle" (the ZeoSphere server/container will return an 'in use' bean to the Pool if it has exceeded this time without a method being invoked);

System role (used by the ZeoSphere server/Container to determine the valid roles for a particular bean and bean method);

Logging Level (used by the ZeoSphere container to determine what messages are logged, with a logging level for the server/container and separate logging levels for each bean Pool within the server/container);

Development Mode (used by the ZeoSphere Container to determine which class loader is used by the ZeoSphere server/container when starting up a bean Pool—development mode will result in a custom class loader allowing for hot-updating of bean logic, while production mode will result in the JDK-provided class loader which only allows for bean logic to be recognized with the next restarting of the server/Container).

This information is stored in two descriptor files as serialized Java beans, ZeoBalanceserver.ser and serverDomain.ser. The ServeDomain serialized Java bean contains the descriptor information for all the servers that the Administrator GUI's are monitoring. Both can be deployed wirelessly to any device running ZeoSphere. The domain of managed devices is maintained via the Security/Application Administrator.

The ZeoSphere server administrator 44 allows the administrator to add, change and deploy the following information about each bean Pool running within each of the ZeoSphere servers it is managing:

Initial pool size (the initial size of the bean Pool—the ZeoSphere server/container will create the bean Pool with this number of beans);

Maximum pool size (the ZeoSphere server/container will not allow the pool to exceed this size);

Minimum Available pool size (the ZeoSphere server/container will not allow the number of available beans within a pool to drop below this number, so that additional beans are created once the server/container determines that the number of beans available for this particular pool has or will drop below this number);

Time-out of a bean in use but "idle" (the ZeoSphere server/container will return an 'in use' bean to the Pool if it has exceeded this time without a method being invoked);

Persistence Frequency (the ZeoSphere server/container will call the bean's ejbStore() method for each bean in the bean Pool with this specified frequency);

Logging Level (used by the ZeoSphere container to determine what bean Pool messages are logged).

Developing and Deploying Applications. When developing a distributed ZeoSphere application, the process involves developing two components which communicate with each other—the client application and the server-side components. Although these two pieces are distinctly different, there are two aspects that are common to both. The logic necessary to make the application remote (e.g., wireless), peer-to-peer, with "m" clients and "n" servers preferably remains hidden within the ZeoSphere framework. Both components are in a current embodiment coded using JDK 1.1.8 on the desktop and Insignia's JEODE VM for the CE-based PDA Devices. One illustrative example of a development/deployment process includes the following sequence of steps:

1. Initiate the ZeoSphere administrator 40.

2. Add/register an application (e.g., iExchange app via the application development tool).

3. Create registered roles (e.g., creating a hierarchy with a parent role (iExchange) and child roles (buyer and seller) and add these as application roles.

4. Create server-side components via the wizard 43 (once the interface for the bean is created, a stubbed-out version of the bean and its client-side "proxy" class (or "shadow") is automatically created, and the shadows are placed in the appropriate application sub-directory).

5. Add the application beans to the application.

6. Generate an application initialization code (this automatically integrates the client application with the ZeoSphere framework. Along with the two classes the tool will generate a batch file called "RunIExchange" used to test the client on the desktop; this batch file will be placed in the Bin folder located under the root ZeoSphereAdmin directory. The tool will also create the .link file and .evm file used to run the client on a CE device. The .link file will be placed in the Links folder located under the root ZeoSphereAdmin directory and the .evm file will be placed under the EVM directory located within the Links directory. In terms of the classes generated by the ZeoSphere tools, a developer will typically deal solely with the IexchangeController.java file. This may serve as the entry point to the application. However, there will be other files that need to be developed to support an application, as well as GUI's or other supporting non-GUI files.)

A look at the IExchangeInitialization generated class reveals the following points: (a) it extends one of two class: com.zeoSoft.ZeoSphere.client.ZeoSphereBaseclient (a default class for all ZeoSphere clients) and com.zeoSoft.ZeoSphere.client.ZeoSphereAdminBaseclient (which allows the ZeoSphere client application to administer the ZeoSphere server running on the same device); (b) it tracks whether communication from servers on other wireless devices has been established with any of the server-side beans associated with the application (this is useful to the client developer, when determining if it can make requests to these components); and (c) it delegates certain method calls to the reference that it maintains of an instance of the interface ZeoSphereclientIntf (the reference is an instance of the Frame/Controller class that will be the entry point to the client application, which gives control to the programmer to provide application specific functionality).

7. Develop the supporting iExchange files by either copying in the provided sample code or writing them from scratch, and implement the appropriate methods within the IexchangeManagerFrame class.

8. Package and deploy the beans. This may include the steps of using the bean development tool to (a) select the bean; (b) using a 'Change server Device' icon, connect to the device to which the bean is to be deployed; (c) select the 'Deploy bean Archive' icon; (d) select 'ZeoBalanceserver' for the destination server; (e) select an appropriate radio button for CAB or JAR depending on the target device; (f) select ok to deploy the bean. In the present embodiment it is important to either deploy all bean(s) (e.g., both buyer and seller beans) to all devices before deploying the application (e.g., iExchange), or deploy the application to all devices before deploying the bean(s). Otherwise, additional steps may be required, such as repackaging the bean jar before continuing deployment.

9. Package and deploy the application. This may include the steps of: (a) selecting the application to be packaged; (b) selecting the bean assigned to the application and archiving it (e.g., .jar or .cab); (c) select all the classes that are to be packaged; (d) select ok, and a .Jar or .cab file is created and deployed to the server running on the target device.

ZeoSphere Database. The ZeoSphere Database Engine is designed for client devices with memory constraints, and can fit within a small (25 KB or less) pure Java library that allows the developer to easily integrate several popular micro databases into their ZeoSphere applications. Some of the third party database engines presently supported are Pointbase's Pointbase Micro Database, the Pointbase Database; IBM's DB2 Everyplace; and IBM's Cloudscape. A developer's learning curve for these databases may be minimized by using a prepackaged ZeoSphere Database Engine. A present implementation of this engine is accessed via a Java interface, and created automatically at start-up of a ZeoSphere client or server. In either case, a runtime argument informs the Database Engine which micro database it is going to be communicating with, and possible values for the runtime argument include: (a) 0—Pointbase Micro Database (for "application specific" data and ZeoSphere data); (b) 1—Cloudscape Database (for "application specific" data and ZeoSphere data); (c) 2—Pointbase Database (for "application specific" data and ZeoSphere data); (d) 3—Pointbase Micro Database (for "application specific" data but a Serialized Java beans for ZeoSphere data); (e) 4—DB2 Everyplace Database (for "application specific" data and ZeoSphere data); and (f) 5—DB2 Everyplace Database (for "application specific" data but a Serialized Java beans for ZeoSphere data).

There are two client 'launch' files created when the "Application Initialization" files are created: (a) .bat file (desktop), and (b) .lnk and corresponding .evm file (CE device). The first runtime argument in the .bat and .evm file determines which micro database the ZeoSphere Database Engine will communicate with. There are also two ZeoSphere server 'launch' files provided: (a) runZeoSphere.bat file (Desktop), and (b) zeosphere.lnk and corresponding zeosphere.evm file (CE Device). The first runtime argument in the .bat and .evm file determines which micro database the ZeoSphere Database Engine will communicate with. Additionally, each bean has two generated convenience methods, which determine from a bean Property what type of micro database to connect to.

Decision Flow Services. The ZDF server software provides a framework for building and administering an organization's business procedures, in the form of workflow processes, as distributed software applications running in the organization's mobile, e-business-to-Enterprise System. Sometimes referred to as ZeoFusion, the ZDF server 50 refers to these workflow processes, which have the option of being rule enabled, as decision flow (DF) processes. This document will refer to the various DecisionFlow components of ZeoFusion. One implementation of the ZDF server 50 includes a J2EE application running within a BEA WebLogic server. The architecture employed by the server leverages the strengths of the J2EE platform (preferably version 1.2 and higher), utilizing Javaserver Pages, EJBs, Java and the Java Message Service (JMS). In this case EJBs provide the backbone support for a robust and scalable workflow architecture, performing many of the services employed during the execution of a workflow. Java is used to create the actions that can be enacted during a workflow task. These actions may, for example, employ authorizations via WAP-enabled cell phone, PDA with wireless connectivity or email, the firing of system processes, casual email notifications or any other action that can be written in Java. Process definitions are employed to configure the actions associated with each of the different states in a workflow process, as well as to define those states themselves. The process definitions can be written in either Java, Blaze or JESS rule syntax and can be composed to define an almost infinite number of workflow processes, including parallel workflows.

In currently implemented approach, ZeoFusion's ZDF server 50 employs a set of collaborating EJBs to carry out its functions, these being mail beans (MailSenderbean and MailReceiverbean), workflow beans (WorkflowProcessorbean, WorkflowHistorybean, Worklistbean, rolesbean and ProcessInstancebean) and rule beans (Rulebean). The mail beans are used to send email notifications and to request user approvals, if required by the workflow task. The ZeoRulesserver is used to execute the rules that define the workflow tasks and configure the workflow actions.

The key abstractions for functioning of this ZDF server 50 are a ProcessInstance, a ProcessDefinition, an Action and a WorkItem. A ProcessInstance represents an individual workflow item that moves through a workflow process. Each ProcessInstance has some finite lifecycle which it progresses through during the workflow process. An example of a ProcessInstance might be a purchase order, a new employee hire or a supply requisition. A ProcessDefinition, on the other hand, is the collection of statements which define a workflow process. A workflow process can be defined as all of the states that a ProcessInstance can transition through during its lifecycle and the actions that are associated with each of those states. For example, a ProcessInstance for a purchase order might have some approval process associated with it. This process could be broken down into a number of states, for example, 'new', 'approval pending', 'approved' and 'rejected'. Next, an Action performs the execution of some automated process or procedure. An action can also include a solicitation for some human interaction. Typically, an action has some number of states that it may transition into during its execution. Actions are autonomous in that all of the logic for the execution of the action as well as any state transitions are all defined within the action itself. Finally, a WorkItem represents a single unit of work that needs to be processed in some way. It encapsulates information about the Action that needs to be processed, information about the ProcessInstance the action belongs to, the time when this Action will expire, a short description of the process that needs to be executed, and information for the user who is responsible for this Action. When each Action is initially executed, a new WorkItem or Workitems are created and stored in the ZeoFusion DecisionFlow database to represent that Action. Upon completion of the Action the corresponding WorkItem is removed from the database. This mechanism allows the DecisionFlow engine to have a master list of all Actions that need to be executed or is in some stage of execution.

First (Presentation) Tier: In the presently preferred three tier architecture for decision flow, the first or presentation tier (also known as a Web tier) provides an interface to the user so that the user can interact with the different aspects of the application and data. The current presentation tier is designed based on a Struts web application framework, which provides the infrastructure for a Model-View-Controller (MVC) design pattern. This pattern provides a separation of the data content (Model), the presentation (View), and the application logic (Controller). This structure increases reusability by partially decoupling data presentation, data representation, and application operations.

In the MVC design pattern, a central Controller mediates application flow. The Controller delegates HTTP requests to an appropriate handler. The handlers are tied to a Model, and each handler acts as an adapter between the request and the Model. The Model represents, or encapsulates, an application's business logic or state. Control is usually then forwarded back through the Controller to the appropriate View. The forwarding can be determined by consulting a set of mappings, usually loaded from a database or configuration file. This provides a loose coupling between the View and Model, which can make an application significantly easier to create and maintain.

Struts applications typically have three major components: a Servlet (the "controller"), which is provided by Struts itself, JSP pages (the "view"), and the application's business logic (the "model"). These three parts of the design are pulled together in the struts-config.xml file. This XML file defines the actions that get executed for JSP's, the beans to store the data for the JSP's, and the application flow from one JSP to another. Full documentation on the Struts framework can currently be found at http://jakarta.apache.org/struts/index.html.

Figure 4:
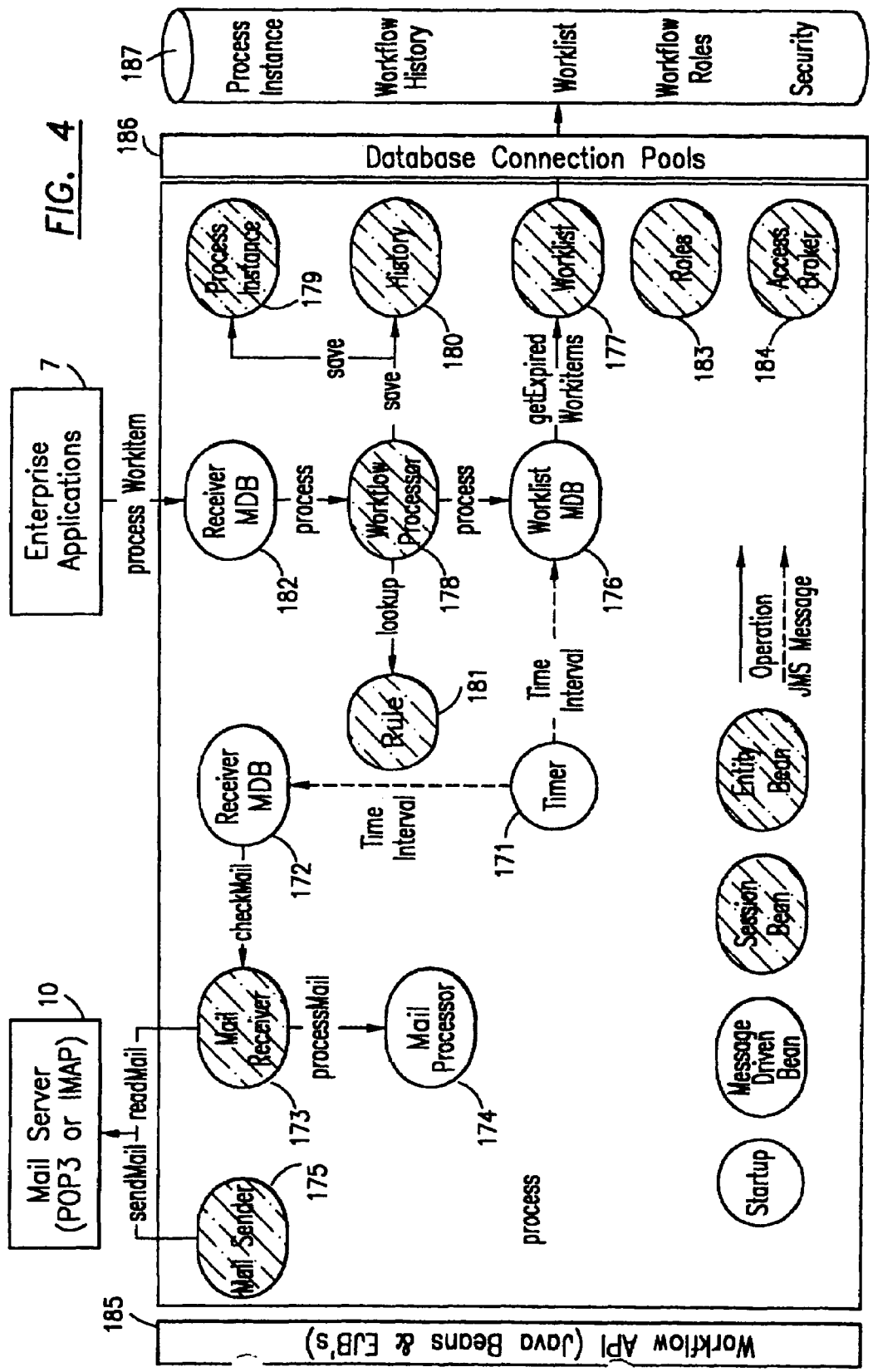
FIG. 4 illustrates components and processes of a ZeoSphere decision flow server.

ZeoFusion Middle Tier: The ZDF server middle tier architecture has been developed as a set of EJBs and supporting Java classes. The architecture utilizes session and entity EJBs as well as message-driven EJBs. The inclusion of message-driven EJBs along with JMS allows asynchronous messaging between services in the ZDF server 50. The illustrative diagram of FIG. 4 shows major components of the system and illustrates the most common interactions between them, some in a modified/alternative embodiment. These are implemented within the ZDF server 50, communicating with clients via a workflow API 185, and enterprise systems such as mail server 10 and applications 7 or 8. Typically decision flow data such as the ProcessInstances and worklists are stored in a local data store 187, in this case accessed via database connection pools 186. One approach to the major components and their functionality is illustrated in FIG. 4, and includes the following components:

1. Timer 171 (Startup): this broadcasts messages over a JMS channel, allowing listeners of this channel to perform routine, time-based operations. The Timer is configurable through a properties file to send an unlimited number of different timer messages each at a fixed frequency, in seconds. The complete Timer facility consists of the TimerController, a timer.properties file and any number of timer objects, implementing a Timer interface. The properties file indicates the names of the timer classes and their broadcast frequency, and designates a frequency, in seconds, at which the TimerController should re-examine the properties file for changes or additions. Upon startup, the Timer Controller creates a timer object for each timer class identified in the timer.properties file. Once created, each timer object runs on its own thread and, at specified intervals, instructs the TimerController to broadcast a specific message. As the Timer is utilized by the ZDF server 50 to routinely check for inbound mail and for expired workitems, a MailTimer and a WorklistTimer have been created for each of those.

2. ReceiverMDB 172 (Message Driven bean): this orchestrates the routine retrieval of email messages. Being a listener for timer messages, the ReceiverMDB, upon receipt of timer messages, instructs the MailReceiver to retrieve messages from its configured mail host and mailbox.

3. MailReceiver 173 (Session bean): when instructed by the ReceiverMDB, the Mail Receiver retrieves email messages addressed to the ZDF server 50. Once retrieved, the email messages are broadcast over a JMS channel to which the MailProcessor is listening. The MailReceiver can also be used as a generic facility to retrieve mail from any inbox on a POP3 or IMAP mail server. This facility is used to interact with end users of the system using email messages. As the users of the ZDF server 50 respond to DecisionFlow emails, the MailReceiver captures those responses forwards them to the MailProcessor via a JMS channel.

4. MailProcessorMDB 174 (Message Driven bean): this performs the interpretation and logical processing of inbound email messages addressed to the ZDF server 50. In a current implementation, each email message has a specific subject line which uniquely describes the type of the message and identifies the MailCommand that needs to be executed. When a new email message arrives on the JMS channel the onMessage() method of the MailProcessorMDB is called with the email message passed as an argument. MailProcessorMDB retrieves the subject of the message which is passed to the MailCommandFactory. At this point all leading blank spaces and "Re:" strings will be stripped from the subject line. The MailCommandFactory attempts to locate an entry in the JNDI tree which matches the subject of the message. Each JNDI entry holds the actual MailCommand class name of the class that needs to be executed in order to process a particular email message. If the MailCommandFactory was able to successfully match the subject of the message with a specific class name, that class is instantiated and the new MailCommand object is returned to the MailProcessorMDB which on his turn invokes processMail() method on that particular MailCommand. For example if the subject of the email message is QUESTION, the MailCommandFactory will search for QUESTION entry in the JNDI tree and create and return object of the corresponding class QuestionCommand. All supported mail commands and corresponding MailCommand class names are read from the configuration file decisionflow.ini and loaded in the JNDI tree upon startup of the WebLogic™ server by the PropertiesLoader startup class. If a MailCommand class name that is associated with the subject of the message could not be found, an email ErrorCommand is instantiated instead and an email message is sent back to notify the user of the problem. An error message is also sent back if for some reason the action associated with the MailCommand could not be carried out i.e. there is no work item that matches the Document ID of the mail message, or the Process Instance associated with this action is locked by another process.

5. MailSender 175 (Session bean): this provides the ability to send email messages using an external POP3 or IMAP mail server. This facility is used to interact with end users of the system using email messages. Messages are sent out using the bean's send() method. The method takes a ZeoMail object as an argument, which is the DecisionFlow engine's internal form of representing and manipulating email messages. Within the Sender bean, each message is converted to a JavaMail object and sent to the target SMTP server. This server's properties are configurable via the bean's properties. SMTP does not require authentication in order to transport an email message. However, most SMTP servers are configured by their administrators to authenticate the mail account before allowing connection with the server. Therefore, the Sender bean will attempt to authenticate via POP3 using the mail account's username and password. Only then will it send the message. A ZeoMailException is thrown to signal that there were problems sending the message.

6. WorklistMDB 176 (Message Driven bean): this orchestrates the routine checking of the worklist for expired workitems. Being a listener for timer messages, the WorklistMDB, upon receipt of timer messages, instructs the Worklist to process all of its expired workitems.

7. Worklist 177 (Session bean): maintains a repository of current workitems. A workitem represents a logical unit of work required from some user of the system. The Worklist is a stateless session bean, and maintains a repository of references to ProcessInstances and/or Actions that are awaiting processing. These references take the form of Workitems. One such entry might be a Question action that has been sent to the recipient, but a response has not yet been received. The Worklistbean utilizes a database for reliable persistence of these items.

8. WorkflowProcessor 178 (Session bean): this coordinates the processing of process instances and is a stateless session bean. This includes the persistence and execution of the process instance and the execution of DecisionFlow actions contained within it. It performs the execution of various workflow services in order to coordinate the entire workflow process. The WorfklowProcessor has a single method, process() which accepts a ProcessInstance as an argument. This method sequentially: saves the process instance; executes the actions contained in the process instance; saves the process instance again; executes the process definition; saves the process instance a final time; and if necessary, places the process instance on the channel to be re-processed.

9. ProcessInstance 179 (Entity bean): this provides a persistence mechanism for process instance objects. A ProcessInstance represents an individual workflow item that moves through a workflow process. Each ProcessInstance has some finite lifecycle, which it progresses through during the workflow process. An example of a ProcessInstance might be a purchase order, a new employee hire or a supply requisition. Each ProcessInstance contains a ProcessDefinition which defines its lifecycle as well as an action or some set of actions which the ProcessInstance is currently executing. The ProcessInstancebean is an entity bean that provides persistence for ProcessInstance objects. The persistence is implemented with bean-managed persistence, allowing safe deployment across EJB containers. The ProcessInstancebean employs the factory and data access object design patterns to provide to the flexibility to easily support persistence in different database tables. In ZeoFusion, the ProcessDefinition interface provides for the execution of a workflow process definition. A workflow process definition is the collection of statements which define a workflow process. Typically this entails the definition of a number of states through which a ProcessInstance transitions through and a set of actions that should be carried out in each of those states. Each ProcessInstance has a single ProcessDefinition, as such a ProcessInstance can follow only one DecisionFlow process. The RuleProcess provides the ability to execute workflow process definitions which are defined in rules. The rules are then executed using the inference engine which has been loaded by the Rulebean. The JavaProcess is an abstract class that represents a process definition created as a Java class. All process definitions that are created in Java should extend this class, defining the execute method. In the execute method the ProcessDefinition should evaluate the state of the ProcessInstance and, based upon that state, create, configure and add actions to the ProcessInstance. These actions would then be executed by the WorkflowProcessor immediately after the execute method returns.

10. History 180 (Session bean): The WorkflowHistorybean captures the entire history of ProcessInstances as they progress through their workflow process. This includes the state changes of the ProcessInstance itself and also the state changes of all of the Actions contained in the ProcessInstance, for the lifecycle of the ProcessInstance.

11. Rule 181 (Session bean): this provides the ability to execute business rules using either the Blaze or JESS Inference engines. This facility is utilized to execute process definitions that have been developed using either the Blaze or JESS rule syntax. If the process definition is written in Java, you can still develop and have a separate rule invoked at an appropriate point within the process (as is done in our CCM-Diabetes Glucose Test example). The rule bean is a stateless session bean, which takes a set of objects and a name of the rule file to process them as arguments. It then executes an appropriate rule and returns the modified set of objects back to the requestor object. An optional additional functionality is to have each passed object know the name of the rule that needs to process it. This makes it possible to use more than one rule in a single processing session to act on the provided objects. For the workflow scenario this will mean that workflow items from different demos (say requisition and health care) can be processed by a single workflow processor, which might be very useful. One of the performance bottlenecks when using rules is the loading of rule files from disk and compiling them to engine-specific rule representation. To get around this, rules may be cached in a rule cache bean—a repository of cached rules. It is a bean-managed entity bean with a rule name as a primary key. It contains an actual instance of a rule engine. Upon creation, a rule cache bean creates an appropriate instance of a rule engine and loads a project file into it. The rule engine type will be determined based on the extension of the file. This instance of the engine will be used to process future requests for this project file. The WebLogic™ cache may store the bean instances for all previously requested rule files in memory.

12. ProcessorMDB 182 (Message Driven bean): this listens on the main workflow channel for ProcessInstance objects and, upon receipt, forwards them to the WorkflowProcessor for processing.

13. Roles 183 (Session bean): this maintains a repository of user/role mappings as well as user preferences. The rolesbean provides access to role and user information stored in the system. ZDF server 50 stores users' personal information as well as contacts and role assignments. Each user may be assigned to only one role. This role assignment provides two benefits to the decision flow: (a) the ability to address a workflow action to a role (this allows an action to address more than one user in a transparent way, so the engine discovers the users who belong to a targeted role and addresses the action to each one); and (b) the association between roles and authorizations (each role can be assigned a set of authorizations, and when a user gets assigned to a role he or she automatically inherits the authorizations that are assigned to that role). The rolesbean has been designed to support more than one type of storage. This is accomplished through the use of Data Access Objects (DAO). The rolesbean holds a reference to DAO interface. At runtime an appropriate DAO class is dynamically loaded into the system and assigned to the DAO reference, held by the role bean. All the calls made to the roles bean are delegated to the DAO through the reference.

14. AccessBroker 184 (Session bean): this maintains a list of all externally available services and provides security to those services through user authentication. ZeoFusion's Access Broker is a stateful session bean that serves as a firewall to the DecisionFlow engine. It provides security in the form of authentication and authorization for a set of services that are exposed to clients. Prior to using any service the user must authenticate with the Access Broker by providing a name and password. Once the Access Broker verifies that this is a valid user, it checks whether this user is authorized to use the requested service. If the user is authorized the Access Broker delegates the request to one or more beans in the DecisionFlow system, otherwise a Security Exception is thrown. Once a user authenticates with the access broker, the client should use the same remote reference for the remainder of the session. All beans, except the Access Broker, are protected by the container security, which means that access to them cannot be obtained using the naming service directly. Only the Access Broker is allowed direct access to other beans. Once an operation is initiated by the Access Broker, beans involved in the operation can communicate freely. Using properties in the bean descriptor an administrator can turn authorization checking on or off as well as specify whether user's authorization set should be cached for the lifetime of the session or retrieved dynamically from the database before every request for a service.

ZeoFusion's Actions, and the order in which they're carried out, are what defines a workflow process. There are seven concrete workflow actions defined: Question, Notification, Pause, JavaCommand, EventBroadcast, DatabaseAction and ScriptExecution. Actions are created, configured and then added to the ProcessInstance by the ProcessDefinition. Actions are then executed by the WorkflowProcessor, sequentially, in the order in which they were added. The Action has the capability to facilitate the repeated execution of the Action in the case that some external influence has prevented its forward movement and eventual completion. An example of this would be a Question, which requires a response from the person or persons to whom it was addressed. If the response is not received after a set period of time the question may be re-sent to the same individual to further solicit a response. This process would be repeated until the maximum attempts value has been exceeded.

The Action class may have a number of predefined states which it may transition through during its lifecycle. With the exception of a NEW state, the use of any state, by derived classes, is optional; subclasses should define any additional states that are required to effectively capture and represent the lifecycle of that action. Some examples of currently implemented actions include:

1. The roleBasedAction: an abstract class that extends the Action class and adds functionality for addressing the Action to any number of named roles or individuals. When addressed to a role the action immediately resolves all members of that role and adds those members, as individuals, to the address list. The resolution of roles to members is unidirectional, meaning that once the members of the role have been added to the address list their relationship to the role is not maintained.

2. The Question action: an inquiry that is intended to gain a response to a question from some number of individuals. The Question action might be used during a 'hire new employee' workflow, wherein a Question action may be sent to the human resources manager to inquire as to which day of the week an interview should be scheduled. The Question action is a roleBasedAction so it may be addressed to any number of named roles or individuals. The Question action may maintain a list of all the responses received—the date of the response, the addressee's name, and answer(s) are captured in a Response object, which is then stored for later use. Once the Question action has been completed the responses can later be retrieved and evaluated. This would typically be performed from within the ProcessDefinition in order to test the outcome of the Question action and then move the process instance to another state.

3. A Notification action: can be used to notify the addresses of some event or solicit non-automated action, or to pass information that simply is sent to an individual or group of individuals. A Notification action requires no response or action from the recipients in order for the workflow process to continue. This could be used to notify individuals with some information about the workflow item. For instance, during an 'employee promotion' workflow, an email notification may be sent to the employees peers in congratulations of his/her promotion. The Notification action is a roleBasedAction so it may be addressed to any number of named roles or individuals.

4. The Script action: a class designed to execute an external script in any of the languages supported by the IBM bean Scripting Framework (BSF), an architecture for incorporating scripting into Java applications and applets. Scripting languages such as Netscape Rhino (Javascript), VBScript, Perl, Tcl, Python, NetRexx and Rexx are commonly used to augment an application's function or to script together a set of application components to form an application. The necessary support files are bsf.jar and bsfengines.jar for the BSF, jpython.jar for JPython support, and jacl.jar and tcljava.jar for JACL support. Other languages can be added as needed.

5. A JavaCommand action: this have the ability to execute any method on any Java class, using Reflection. This is a powerful action that could be used to access legacy systems, Enterprise Java beans, or any other operation that is exposed via a Java class. For instance, during a 'purchase order' workflow, the final workflow operation might involve the posting of the purchase order details to a legacy accounting system. This could be provided by developing a Java class thet accesses the accounting system, using the Java Native Interface (JNI). The methods of that class could then be invoked unsing the JavaCommand action.

6. An EventBroadcast action: transmits a message over a designated event channel. This is a powerful action that could be used to access legacy systems which have message-based API's. For instance, during a 'purchase order' workflow, the final workflow operation might involve the sending of a purchase order to a legacy accounting system via an event channel. It could also be used to trigger the completion of a message-based Pause.

7. A DatabaseAction: is an SQL call that will be executed against an RDBMS. For instance, during a 'purchase order' workflow, the final workflow operation might involve the saving of the purchase order details to an enterprise RDBMS.

8. A Pause action: causes the workflow process to pause for a period of time. The period of time can be specified as an elapsed amount of time, a specific date and/or time of day, or until a specified message JMS is received. This action can be used to postpone the processing of a process instance until some other desired time-based event has occurred. For example, during a 'purchase order' workflow, the posting of purchase orders into a legacy accounting system may need to wait until daily batch processing has occurred, say after midnight each evening or, in the case of a message-based pause, until the legacy system has broadcast a message indicating that the batch processing has occurred and it is ready to receive postings. Another example could be that all approvals for purchase orders should only be sought on a specific day of the week or only 2 hours after they have been submitted.

EXAMPLES

Figure 2D:
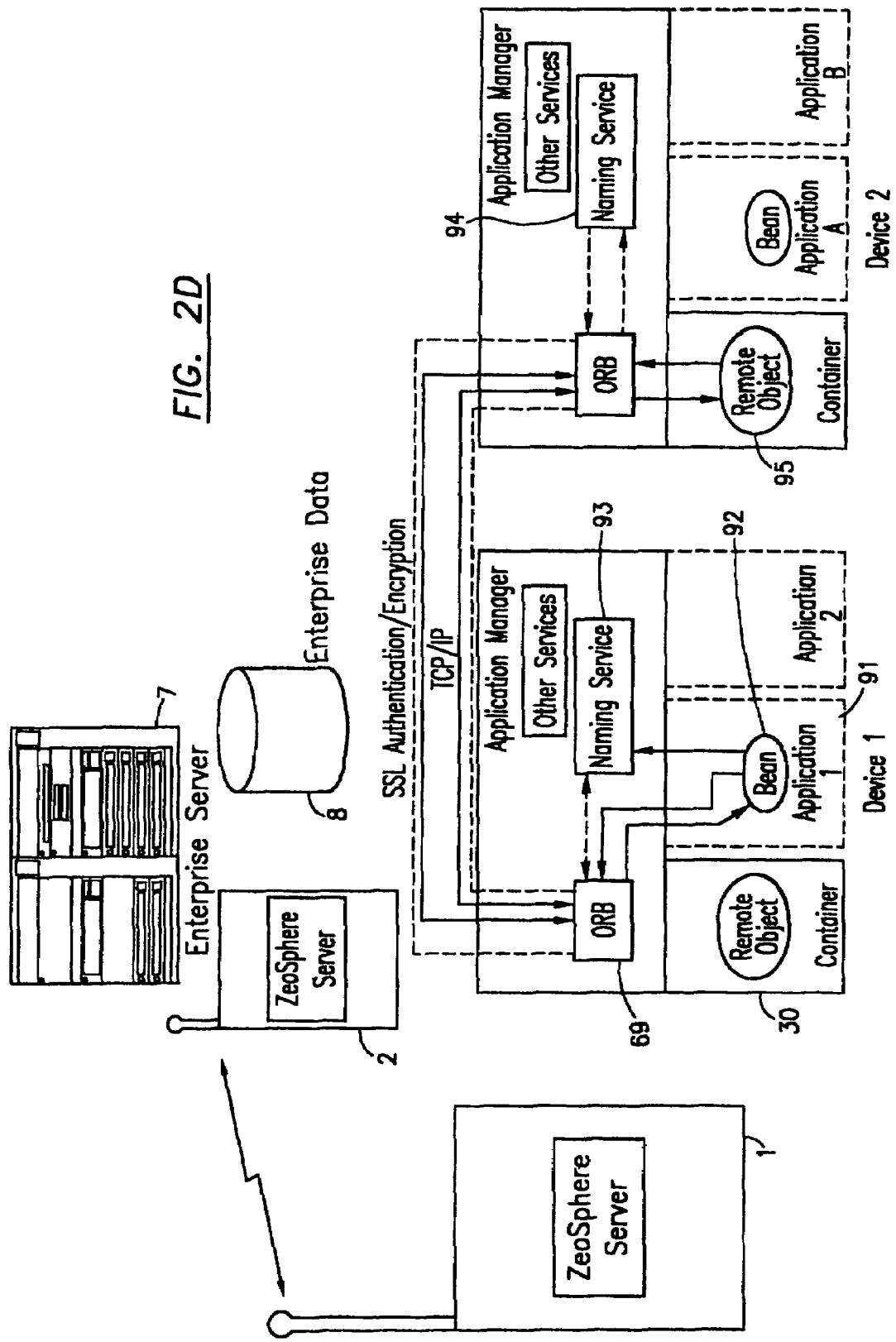

FIGS. 2D through 3E illustrate examples of different process flows that may occur within a ZeoSphere framework. Turning first to FIG. 2D, a device to device process is shown in which device 1 needs to make a request for processing, and device 2 has a ZeoSphere server and application capable of processing the request. An application 91 of device 1 begins by checking the on-device naming service 93 to see if the address of the remote object is listed (step 1). If so, the application makes a call directly to that remote object 95 via ORB 69 using its shadow (step 2). After the requested processing takes place via remote object 95, the desired information is returned to application 91 (step 3). If, on the other hand, the address of the remote object is not listed in the on-device naming service, the object's address must first be discovered. The naming service 93 contacts the naming service 94 on device 2 to request the addresses of the remote objects on device 2 (step 4). Once these addresses are returned (step 5), the remote request may be processed as above (steps 2-3). Because each device has a ZeoSphere server operating, this process can be bi-directional. For example, application A of device 2 may at the same time make a request of remote object 91 on device 1. Access to enterprise resources is handled in a similar manner with those requests routed through the proxy server 75.

Turning to FIG. 3A, the use of ZeoSphere servers now frees administrators to design their network systems so small mobile devices 1, 2 like PDAs can invoke methods a variety ways to serve each other and other enterprise clients. Both devices include clients 101, 106, ZeoSphere servers 102, 107, and resident input/output means 105, 110 and files or data stores 104, 109. Running on JVMs, either client 101, 106 or server 102, 107 may invoke methods (115-117) to ZeoSphere server beans 103, 108. This may be in response to user input (111), and require data from the remote data store 119 or user 110.

FIG. 3B illustrates a simple inventory adjustment sequence. In this case, the user of device 1 instructs client application 101 to process an inventory update. In response, client 101 sends 121 an update to its database 104, but also invokes 122 a method requesting bean 108 on a central device (Medic Central) to update 123 an associated database 109 value, and also to instruct 124 client 106 to refresh an output (user display).

Figure 3C:
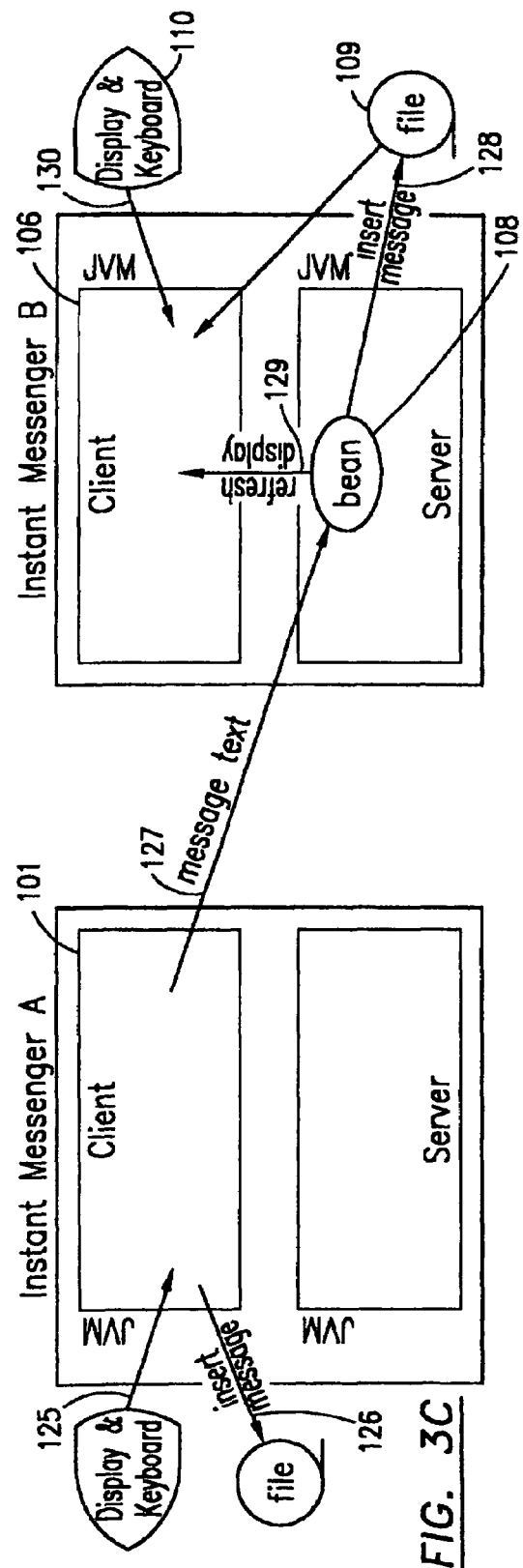

FIG. 3C illustrates a simple messaging sequence, similar to the processes of FIG. 3B. In this case a user inputs text to Instant Messenger A. Client 101 next inserts 126 the message to a file, and sends 127 the message text to Instant Messenger B. Server bean 108 processes the text, and inserts 128 the message text in file 109. It also instructs 129 client 106 to refresh 130 the user display 110.

Figure 3D:
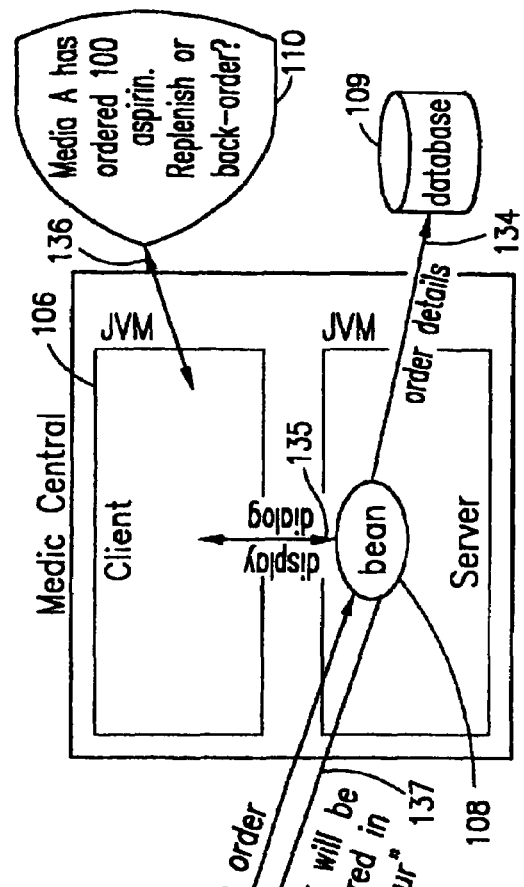
Figure 3D:
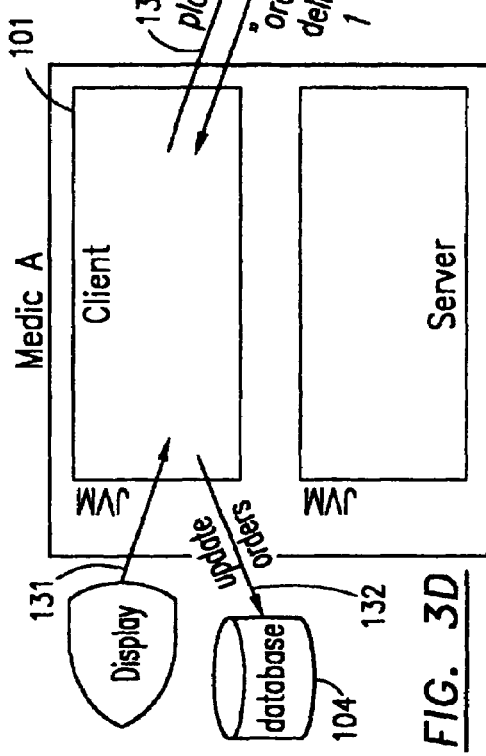

FIG. 3D illustrates another way in which ZeoSphere servers may be advantageously used to allow the extension of automated processes out into the mobile network. It begins with client 101 of Device 1 (medic A) placing an order 133. This may be done at the initiation of a user input, or otherwise in response to a further automated process (e.g., an alert notifying client 101 or its server that inventory levels have dropped below a set threshold). In response to the request 133, the server 108 processes the request and generates a display dialog 135, 136 to a user via display 110. The user response can be facilitated via predefined choices (a-replinsh; b-backorder), or via other acceptable inputs, even natural language inputs if appropriate rules processing engines are available locally or remotely. The response is then returned to client 101, and details stored 134 in database 109.

FIG. 3E shows a more complicated process in which four different devices interact. Client 101 begins, as in the illustration of FIG. 3D, placing an order 134 to a central server (Medic Central). However, either no reply is received, or through other device updates client 101 determines that Medic Central is not responding and other devices should be queried. An order method is invoked 144 to Medic B server, which queries 146 database 109C. Since too low of a value is stored in database 109B (10 aspirins, when the order requested 100), a reply 144 is returned indicating the requested amount is not available. In response, client 101 automatically generates a further request 145, this time to Medic C. The request is similarly processed, but since database 147 indicates a sufficient inventory exists, a response confirming the order is sent to client 101 and a local user display dialog regarding the order is generated. It should also be noted that while all devices may be part of the same enterprise, the ZeoSphere framework can be extended to grant permissions to users and devices outside an enterprise—for example, to its customers—to access certain of the enterprise's servers. This may involve additional security or deployment steps, such as coordination between administrators when beans on registered client/server devices belonging outside of the first enterprise need to be deployed or modified. It is also possible to extend notions of one's network in new directions, since the advent of lightweight ZeoSphere servers means it is also possible to deploy a small instance of one's network (a PDA, an embedded controller with wireless interface) physically at a customer's premises to facilitate and, if permitted automatically monitor events calling for, agreed processes to be run.

It should be appreciated from the examples above that ZeoSphere, as the first lightweight application server for mobile processing devices like PDAs enables a wide variety of applications hitherto impractical or impossible to implement. The ZeoSphere mobile platform allows enterprise-wide direct device-to-device data queries and application requests, with or without a connection to the traditional enterprise network.

It in fact enables a redefinition of an organization's network, bringing edge or unconnected devices into the network framework. It goes so far as to allow for entirely mobile networks. For example, a platoon could stay tightly linked carrying ZeoSphere-enabled wireless PDAs, and rescue parties or firefighters in remote areas could use a variety of platforms like 3G cell phones and PDAs with ZeoSphere servers and GPS-enabled mapping apps to carry out their mission with previously unattainable speed and accuracy of information sharing. New applications, like biometric (fingerprint, voice recognition apps) are now accessible to small or remote devices, and ones newer still can easily be added. Intelligent agent processing is now extended to almost completely eliminate the constraints of time and space. If persons with approval authority are not accessible even at their PDA, requests can easily be rerouted, alternatives automatically presented, and intelligent rules or agents can even take a range of approved actions. Away from wireline access, a group of ZeoSphere-enabled wireless devices could even form a network of switching nodes. Since ZeoSphere's unique technology makes peer-to-peer and peer-to-enterprise servers out of mobile devices, administrators can deploy and manage an n-tier distributed information system, accessing each other's databases, applications, and other device-bound services as though they were office servers, data center servers, or legacy computers, for true mobile computing anywhere, anytime.

To recap, some of the features that the ZeoSphere mobile platform offers are:

- Integrating CORBA/EJB server, client application and local database storage on handheld mobile or wireless devices;
- Providing rule-based and decision-based workflow technology on the handheld wireless device;
- Processing information independent of a traditional network connection to an enterprise system;
- Synchronizing data continually or periodically to an enterprise system depending upon whether or not the user is connected to the enterprise;
- Developing, deploying and managing businessware, client applications and infrastructure components for all types of devices, mobile, fixed or not easily moved, and embedded;
- Supporting strong security such as Secure Socket Layer (SSL) and Service Request Encryption;
- Supporting server administration for both role and application based security;
- Supporting open standards architectures such as CORBA®, Java ™ and SOAP, as well as common platforms like Windows® CE, Symbian OS and SavaJe XE operating systems;
- Interacting with device-resident third-party lightweight apps (e.g., micro databases, or third-party databases as well as "Flat" file structures)
- Communicating wirelessly with enterprise servers like Apache/Tomcat SOAP Servers
- Providing a convenient development and remote deployment and management environment
- Communicating wirelessly with ZeoFusion, the enterprise-based distributed decision flow and the inference engine
- Using a lightweight transfer protocol such as IIOP
- Providing dynamic IP and in-process 'naming service' support Those skilled in the art will appreciate that while certain specific embodiments have been discussed above, such as the ZeoSphere server functioning with a current Java-based JVM, other components may be used with readily understood design tradeoffs. Thus, any convenient or dictated operating system (like Windows CE found in many PDAs, Linux, Unix, proprietary embedded controller code, etc.) may be used, a platform-independent layer provides the ability for on-demand modifications to be implemented without the need for an enterprise to know how to code for each device and operating system deployed. Java currently provides a good solution for this platform-independence, but other solutions may be used with the invention. Similarly, other features or components may be substituted by known, or yet to be invented but similar, embodiments. Thus, for example, an assortment of platform-independent enabled devices and proprietary devices may still function within the ZeoSphere mobile platform. This would mean, of course, an increased administrative and development burden to keep the enterprise system functioning as desired, but the server implementations on the mobile devices can be designed with the intelligence to direct the appropriate information flow with devices having more limited features and functionality. However, in a preferred system a widely implemented platform-independent architecture such as provided by programs like Java and/or its JVM will facilitate all aspects of the system evolution and reduce the implementational costs and burdens.

While the foregoing constitute certain present, preferred and alternative embodiments of the invention, it is to be understood that the invention is not limited thereto, and that in light of the present disclosure various other embodiments should be apparent to persons skilled in the art. Thus, for example, while the preferred embodiment is illustrated in connection with client and server architectures and present (2002) computer environments such as Java and Windows, the invention may be used in any processing environment in which a variety of programs (whether software, firmware or the like) are used and a distributed form of service application management and operation is desirable. Further, while the present and preferred embodiment have been described in terms of particular hardware and software, those skilled in the art will recognize how to implement various aspects of the invention in either hardware, software, or some combination of hardware and appropriately configured programs and processors implementing the described functionality, depending on the design choices that a skilled artisan may make. Accordingly, it is to be recognized that changes can be made without departing from the scope of the invention as particularly pointed out and distinctly claimed in the appended claims which shall be construed to encompass all legal equivalents thereof.

We claim:

1. A system of client and server devices comprising:
   at least one mobile wireless device, each mobile wireless device comprising an application server including an application in a services container, and a client in a services container, the application server being responsive to inputs from at least one other device, the services container of each of the application and the client controlling at least one of security, application life cycle or a persistence requirement, the services container including the application comprising a database application and an object operable to access a data storage;
   a network for providing communications between the devices;
   a device operable for managing the application server on the at least one mobile wireless device; and wherein
   the application in a services container is operable for processing communications sent via the network from another device and the client in the services container is operable for transmitting, via the network, communications to another device.

2. The system of claim 1, wherein the services container including the application comprises an administrative object operable for controlling at least one application operating on at least one of the at least one mobile wireless client device.

3. The system of claim 2, comprising an application manager including a deployment engine for changing functionality of the application server in response to remote control.

4. The system of claim 3, comprising an application manager including an administrative tool operable to poll status of the at least one mobile wireless device.

5. The system of claim 2, comprising an application manager including an administrative tool operable to poll status of the at least one mobile wireless device.

6. The system of claim 2, comprising plural service containers each including an application, each services container including an application comprising a Java application, wherein the application manager runs on a Java virtual machine and is operable to deploy, initiate or stop Java applications in the plural service containers without closing the Java virtual machine.

7. The system of claim 1, comprising an application manager including a database access manager.

8. The system of claim 7, comprising a database access manager including an encryption module using one of a group of a private key operable to decrypt data accessed from the data store, a shared private key operable to encrypt the business object, and a public key of the client operable to encrypt the business object.

9. The system of claim 8, comprising an application manager including a deployment engine for changing functionality of the application server in response to remote control.

10. The system of claim 9, comprising an application manager including an administrative tool operable to poll status of the at least one mobile wireless device.

11. The system of claim 8, comprising an application manager including an administrative tool operable to poll status of the at least one mobile wireless device.

12. The system of claim 7, comprising an application manager including a deployment engine for changing functionality of the application server in response to remote control.

13. The system of claim 12, comprising an application manager including an administrative tool operable to poll status of the at least one mobile wireless device.

14. The system of claim 7, comprising an application manager including an administrative tool operable to poll status of the at least one mobile wireless device.

15. The system of claim 1, comprising an access manager including an API operable for receiving a client database request, accessing the data storage on the at least one mobile wireless device, populating a business object with returned data, and sending the populated business object to a calling method of the client in the services container on the at least one mobile wireless device.

16. The system of claim 15, comprising an application manager including a deployment engine for changing functionality of the application server in response to remote control.

17. The system of claim 16, comprising an application manager including an administrative tool operable to poll status of the at least one mobile wireless device.

18. The system of claim 15, comprising an application manager including an administrative tool operable to poll status of the at least one mobile wireless device.

19. The system of claim 1, comprising an application manager including a graphical user interface.

20. The system of claim 19, comprising an application manager including a deployment engine for changing functionality of the application server in response to remote control.

21. The system of claim 20, comprising an application manager including an administrative tool operable to poll status of the at least one mobile wireless device.

22. The system of claim 19, comprising an application manager including an administrative tool operable to poll status of the at least one mobile wireless device.

23. The system of claim 19 wherein the graphical user interface is operable to provide users of the at least one mobile device with secure management.

24. The system of claim 23 wherein the graphical user interface is operable to provide users of the at least one mobile wireless device with secure management to control the application manager and the application in a services container.

25. The system of claim 1, comprising an application manager including a deployment engine for changing functionality of the application server in response to remote control.

26. The system of claim 25, comprising an application manager including an administrative tool operable to poll status of the at least one mobile wireless device.

27. The system of claim 1, comprising an application manager including an administrative tool operable to poll status of the at least one mobile wireless device.

28. The system of claim 1, comprising an application manager including a security manager.

29. The system of claim 1, comprising an application manager and wherein the application in a services container comprises plural service containers each comprising a Java application.

30. The system of claim 29 wherein the application manager runs as a JAVA application.

31. The system of claim 29 wherein the application manager is operable to deploy, initiate or stop JAVA applications in the plural services containers.

32. The system of claim 1 comprising an application manager operable to manage an application object and wherein the application server in a services container comprises at least one services container and an application object.

33. The system of claim 32, comprising a security service, the application object is an application and the application manager is operable to set a parameter for limiting access to the application unless a security requirement is satisfied for responding to requests from remote objects.

34. the system of claim 1, comprising plural embedded devices comprising program logic.

35. The system of claim 1, comprising an API operable for receiving a client database request, accessing a data storage on each wireless device, populating a business object with returned data, and sending the populated business object to a calling method of the client in the services container, the services container containing the application being operable to access the data storage even if the client in the services container is using a different database application.

36. The system of claim 1 wherein the security manager is operable to verify that communications with the application server are with trusted sources.

37. The system of claim 1 wherein the security manager is operable to enable encrypted communications.

38. The system of claim 1 wherein a user interface is provided by the at least one mobile wireless device.

39. The system of claim 38 wherein the user interface is a web interface.

40. The system of claim 1 wherein the communication between the devices is provided over TCP/IP.

41. The system of claim 1 wherein the communication between the devices is provided by SOAP.

42. The system of claim 1 wherein the data storage comprises a database.

43. The system of claim 42 wherein the database comprises a micro-database.

44. The system of claim 1 wherein the services container including the application synchronizes data with an enterprise system.

45. The system for claim 1 wherein the device operable for managing the application server on the at least one mobile wireless device deploys an application to the at least one mobile wireless device.

46. The system of claim 1 wherein the device operable for managing the application server on the at least one mobile wireless device deploys a software component.

47. The system of claim 46 wherein the software component comprises an application.

48. The system of claim 46 wherein the software component is deployed within the services container including the application.

49. The system of claim 46 wherein the software component is deployed outside the services container including the application.

50. The system of claim 1 wherein the object operable to access a data storage accesses the data storage through JDBC.

51. The system of claim 1 wherein the communication between the devices supports SSL.

* * * * *